United States Patent
Jinbo

(10) Patent No.: US 7,928,777 B2
(45) Date of Patent: Apr. 19, 2011

(54) SEMICONDUCTOR DEVICE AND METHOD OF SUPPLYING INTERNAL POWER TO SEMICONDUCTOR DEVICE

(75) Inventor: Toshikatsu Jinbo, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 35 days.

(21) Appl. No.: 12/585,499

(22) Filed: Sep. 16, 2009

(65) Prior Publication Data

US 2010/0085088 A1 Apr. 8, 2010

(30) Foreign Application Priority Data

Oct. 3, 2008 (JP) ................................ 2008-258027

(51) Int. Cl.
*H03L 7/00* (2006.01)
(52) U.S. Cl. ...................................................... 327/143
(58) Field of Classification Search .................. 327/143, 327/142, 198
See application file for complete search history.

(56) References Cited

U.S. PATENT DOCUMENTS

| | | | |
|---|---|---|---|
| 5,936,443 A | 8/1999 | Yasuda et al. | |
| 7,508,254 B2 * | 3/2009 | Hachiya et al. | 327/540 |
| 7,679,412 B2 * | 3/2010 | Ogiwara et al. | 327/143 |
| 7,701,265 B2 * | 4/2010 | Maeda | 327/143 |

FOREIGN PATENT DOCUMENTS

JP 09-153777 6/1997

* cited by examiner

*Primary Examiner* — Hai L Nguyen
(74) *Attorney, Agent, or Firm* — Foley & Lardner LLP

(57) ABSTRACT

Provided is a semiconductor device including a step-down circuit group including multiple step-down circuits that step down an external power supply voltage to a predetermined voltage; multiple functional circuits that require a reset operation upon power-on; and a power-on reset circuit that outputs a reset command to the multiple functional circuits, when an internal power supply voltage supplied from the step-down circuit group exceeds a voltage level necessary for an initialization operation. The multiple step-down circuits of the step-down circuit group are classified into a startup operating step-down circuit group that performs a step-down operation from power-on to supply the internal power supply voltage, and a startup non-operating step-down circuit group that stops operation upon power-on to interrupt supply of the internal power supply voltage. The startup non-operating step-down circuit group includes the multiple step-down circuits sequentially selected from one having a shortest wiring distance from the power-on reset circuit.

7 Claims, 20 Drawing Sheets

PRIOR ART

SEMICONDUCTOR DEVICE AND METHOD OF SUPPLYING INTERNAL POWER TO SEMICONDUCTOR DEVICE

BACKGROUND

1. Field of the Invention

The present invention relates to a semiconductor device and a method of supplying internal power to the semiconductor device.

In particular, the present invention relates to a semiconductor device having a configuration in which an externally supplied power voltage is stepped down to an internal power voltage, and an internal power is supplied to each circuit provided in the semiconductor device.

2. Description of Related Art

As an example of semiconductor devices, there are known semiconductor memories using DRAM memory cells. To enhance the integration degree of each semiconductor memory, peripheral transistors constituting memory devices and peripheral circuits have been miniaturized. Along with a further miniaturization of the memory devices and peripheral transistors, the voltage that can be applied to these devices is limited to a low voltage so that high operation reliability is secured. On the other hand, it is important for each semiconductor memory to maintain compatibility as a product. Accordingly, the semiconductor memory needs to operate with accuracy, even if a power supply voltage is externally supplied in a conventional manner.

In specifications in which a voltage of 1.8 V is supplied as an external power supply voltage, for example, when it is assumed that a power supply voltage of up to 1.5 V can be applied to a device in terms of reliability, it is necessary to drop the external power supply voltage of 1.8 V to 1.5 V by using a step-down circuit provided in the semiconductor memory, and to supply the voltage thus obtained to memory devices and peripheral transistors as an internal power supply voltage.

The voltage to be supplied to the peripheral circuits is limited to a small voltage by the step-down circuit as described above, thereby obtaining an effect of reducing the amplitude of an operating voltage of each peripheral circuit and reducing the consumption current of the semiconductor memory, aside from the effect of securing high reliability.

As described above, it is necessary for the semiconductor device to generate an internal power supply voltage that can be used in internal circuits by converting the externally supplied power supply voltage.

When the step-down circuit is incorporated into the semiconductor device, a plurality of step-down circuits is dispersed on a chip.

Because the memory capacity of the semiconductor memory increases, resulting in an increase in chip size, for example; and the consumption current of peripheral circuits has been increased along with a high-speed operation.

FIG. 11 is a block diagram showing the configuration of a semiconductor memory 1 of the related art using DRAM memory cells.

The semiconductor memory 1 includes peripheral circuits 10 and a memory core circuit 20. The semiconductor memory 1 is supplied with input/output data signals DQ0 and DQ1 to DQ31, control signals CE and WE to CLK, address signals A0 and A1 to An, a power supply voltage VDD, and a ground voltage GND from the outside of the semiconductor memory through bonding pads.

As the peripheral circuits 10, there are provided a data control circuit 11, a command control circuit 12, an address control circuit 13, and a data control circuit 14.

Although not shown in FIG. 11, a power supply control circuit, a test circuit, and the like may be provided.

The input/output data signals DQ0 to DQ15 are input to/output from the data control circuit 11, and the input/output data signals DQ16 to DQ31 are input to/output from the data control circuit 104.

The memory core circuit 20 includes a DRAM memory cell array 25, an array data-related circuit 21, an array control-related circuit 22, an array address-related circuit 23, and an array data-related circuit 24. The array data-related circuit 21, the array control-related circuit 22, the array address-related circuit 23, and the array data-related circuit 24 are used for controlling the DRAM memory cell array 25 in accordance with data, commands, and addresses received from the peripheral circuits 10.

The input/output data signals DQ0 to DQ15 are input to/output from the array data-related circuit 21, and the input/output data signals DQ16 to DQ31 are input to/output from the array data-related circuit 24.

FIG. 12 is a block diagram showing a circuit configuration for supplying voltage to the peripheral circuits 10.

The power supply voltage VDD passes through a step-down circuit group 16 and becomes an internal power supply voltage VDL. Then, the internal power supply voltage VDL is supplied to the data control circuit 11, the command control circuit 12, the address control circuit 13, and the data control circuit 14, and is further supplied to a power-on reset circuit 15 for initializing the peripheral circuits after power-on.

The step-down circuit group 16 includes step-down circuits $16V_1$ to $16V_8$ which are dispersed.

The plurality of step-down circuits $16V_1$ to $16V_8$ is dispersed as described above, which makes it possible to design the circuit such that a drop of an internal voltage generated by an operating current of the peripheral circuits during the operation of the semiconductor memory is limited to a predetermined level to secure the operation.

In this case, the internal power supply voltages VDL, which are supplied to the data control circuit 11, the command control circuit 12, the address control circuit 13, the data control circuit 14, and the power-on reset circuit 15, are respectively represented by $VDL_1$, $VDL_2$, $VDL_3$, $VDL_4$, and $VDL_P$.

FIG. 13 is a circuit diagram showing the power-on reset circuit 15.

FIG. 14 is a voltage waveform chart illustrating the operation of the power-on reset circuit 15.

The power-on reset circuit 15 includes resistor elements $R_1$, $R_2$, $R_3$, and $R_4$, p-type MOSFETs $MP_1$ and $MP_2$, and n-type MOSFETs $MN_1$ and $MN_2$.

As shown in FIG. 13, it is assumed herein that a potential at a node between the resistor elements $R_1$ and $R_2$ is represented by $V_{r1}$; a potential at a node between the p-type MOSFET $MP_1$ and the resistor element $R_3$ is represented by $V_{r2}$; and a potential at a node between the resistor element $R_4$ and the n-type MOSFET $MN_1$ is represented by $V_{r3}$.

It is also assumed that $R_1=R_2$; a threshold voltage of each of the p-type MOSFETs $MP_1$ and $MP_2$ is expressed by $Vtp=-0.4$ V; and a threshold voltage of each of the n-type MOSFETs $MN_1$ and $MN_2$ is expressed by $Vtn=0.4$ V.

The operation of the power-on reset circuit 15 will be described with reference to FIG. 14.

Each node of the power-on reset circuit 15 is set to a ground level (0 V) before the internal power supply voltage $VDL_P$ rises. Then, the internal power supply voltage VDL starts to rise. In this case, the potential $V_{r1}$ is determined by a value which is obtained by dividing the internal power supply voltage $VDL_P$ using the resistor elements $R_1$ and $R_2$.

$$V_{R1}=VDL_P \times R_2/(R_1+R_2)$$

As apparent from the above formula, the potential $V_{r1}$ rises with the internal power supply voltage $VDL_P$ at a ratio represented by the above formula.

In the process in which the internal power supply voltage $VDL_P$ rises, a potential difference $(V_{r1}-VDL_P)$ between the gate and source of the p-type MOSFET $MP_1$ does not exceed the threshold voltage Vtp in a region where the internal power supply voltage $VDL_P$ is equal to or higher than 0 V and lower than 0.8 V (in a time period prior to a time TRST). Accordingly, the p-type MOSFET $MP_1$ is in a non-conductive state.

In this case, the potential $V_{r2}$ is fixed at 0 V, and thus the n-type MOSFET $MN_1$ is also in a non-conductive state.

When the $V_{r3}$ is pulled up to the internal power supply voltage VDL by the resistor element $R_4$, the n-type MOSFET $MN_2$ is turned on and an output RST is maintained at 0 V.

When the internal power supply voltage $VDL_P$ exceeds 0.8 V (in a time period after the time TRST), the potential difference $(V_{r1}-VDL_P)$ between the gate and source of the p-type MOSFET $MP_1$ exceeds the threshold voltage Vtp, and the p-type MOSFET $MP_1$ is rendered conductive. Then, as the potential $Vr_2$ rises, the $MN_1$ is rendered conductive. When the potential $Vr_3$ is pulled down, the p-type MOSFET $MP_2$ is turned on and the output RST changes to high level.

As described above, in the power-on reset circuit 15 shown in FIG. 13, the output RST becomes low level in the region in which the internal power supply voltage VDL is equal to or higher than 0 V and lower than 0.8 V, and the output RST becomes high level when the internal power supply voltage $VDL_P$ exceeds 0.8 V.

An inversion level (0.8 V in the above example) of the power-on reset circuit 15 is generally set by giving a margin to the level of the internal power supply voltage VDL at which the circuits (e.g., the data control circuits 11 and 14, the command control circuit 12, and the address control circuit 13) receiving the initialization signal RST can execute an initialization operation normally.

For example, if the data control circuits 11 and 14, the command control circuit 12, and the address control circuit 13 can be normally initialized with the internal power supply voltage VDL of 0.6 V or higher, the inversion level of the power-on reset circuit 15 is generally set to about 0.8 V, as in the above example.

On the other hand, when the inversion level of the power-on reset circuit 15 is raised, a sufficient margin for the initialization is secured. However, during the normal circuit operation, a malfunction may frequency occur in which the power-on reset circuit 15 responds to a small voltage drop of the internal power supply voltage VDL and issues the initialization operation again. Thus, the inversion level of the power-on reset circuit 15 cannot be easily set to high level.

FIG. 15 is a diagram showing the circuit configuration of the step-down circuits $16V_1$ to $16V_8$ of the related art.

Each of the step-down circuits $16V_1$ to $16V_8$ includes a differential circuit section 16A, a current control section 16B, and a voltage supply section 16C. The differential circuit section 16A includes p-type MOSFETs $MP_{12}$ and $M12_{13}$ and n-type MOSFETs $MN_{12}$ and $MN_{13}$. The current control section 16B includes a p-type MOSFET $MP_{11}$, a resistor $R_{11}$, and n-type MOSFETs $MN_{11}$ and $MN_{14}$. The voltage supply section 16C includes a p-type MOSFET $MP_{14}$ and resistors $R_{12}$ and $R_{13}$. Further, a reference voltage $V_{REF}$ for setting the level of the output voltage VDL is input to the gate of the n-type MOSFET $MN_{12}$.

Note that a potential at a node between the resistors $R_{12}$ and $R_{13}$ is represented by $V_{MON}$.

The levels of the internal power supply voltages VDL generated by the step-down circuits $16V_1$ to $16V_8$ are determined by the reference voltage $V_{REF}$ serving as an input of the differential circuit section 16A, and the divided voltage $V_{MON}$ which is determined by the resistors $R_{12}$ and $R_{13}$.

In this case, the level of the voltage $V_{MON}$ is expressed by the following formula.

$$V_{MON}=VDL \times R_{13}/(R_{12}+R_{13})$$

When a comparison ratio of the differential circuit section 16A is 1:1, a stabilization point is expressed by $V_{REF}=V_{MON}$, and the following formula is obtained.

$$V_{REF}=V_{MON}=VDL \times R_{13}/(R_{12}+R_{13})$$

From this formula, the following formula is obtained.

$$VDL=V_{REF} \times (R_{12}+R_{13})/R_{13}$$

In the case where the internal power supply voltage VDL is set to 1.5 V when the external power supply voltage VDD is 1.8 V, it is apparent from the above formula that $V_{REF}=0.75V$, $R_{12}=R_{13}$, for example, are satisfied.

FIG. 16 is a voltage waveform chart illustrating the operation of the step-down circuits $16V_1$ to $16V_8$.

The operation of the step-down circuits $16V_1$ to $16V_8$ will be described with reference to FIG. 16. When the reference voltage $V_{REF}$ is set to 0.75 V after power-on of the external power supply VDD, the step-down circuits $16V_1$ to $16V_8$ raise the level of the internal power supply voltage VDL. As the internal power supply voltage VDL rises, the level of the voltage $V_{MON}$ also rises. Then, when the internal power supply voltage VDL rises up to 1.5 V, the voltage $V_{MON}$ becomes 0.75 V and $VREF=V_{MON}$ is satisfied. Accordingly, the internal power supply voltage VDL is controlled at 1.5 V.

As shown in FIG. 12, the internal power supply voltages $VDL_1$, $VDL_2$, $VDL_3$, $VDL_4$, and $VDL_P$, which are respectively supplied to the functional circuits 11 to 15, are set to the same voltage level in terms of DC. However, the voltage levels of the internal power supply voltages in terms of AC during the power-on process or circuit operation vary due to the effects of the consumption current, parasitic capacitance, and power supply wiring resistance of their functional circuits.

Reference is now made to FIG. 17 which is a graph showing the effects of the parasitic capacitance on the rise of the internal power supply voltage VDL during the power-on process.

In FIG. 17, the horizontal axis represents time and the vertical axis represents the voltage level of the internal power supply voltage VDL.

It is assumed herein that each of the step-down circuits $16V_1$ to $16V_8$ has a small power supply capability corresponding to the power-on process.

In FIG. 17, $L_{01}$ represents a voltage transition when a circuit having a parasitic capacitance CL of 2000 pF is started using a constant current of 1 mA; $L_{02}$ represents a voltage transition when a circuit having a parasitic capacitance CL of 3000 pF is started; and $L_{03}$ represents a voltage transition when a circuit having a parasitic capacitance CL of 5000 pF is started using a constant current of 1 mA.

As shown in FIG. 17, when the parasitic capacitance is small (e.g., CL=2000 pF or CL=3000 pF), the voltages $L_{01}$ and $L_{02}$ rise relatively quickly along with the internal power supply voltage VDL. Meanwhile, when the parasitic capacitance is large (e.g., CL=5000 pF), the voltage $L_{03}$ rises with a significant delay from the internal power supply voltage VDL.

It is assumed in FIG. 12 that the parasitic capacitance of the data control circuit 11 supplied with the internal power supply voltage $VDL_1$ is 2000 pF; the parasitic capacitance of the command control circuit 12 supplied with the internal power supply voltage $VDL_2$ is 5000 pF; the parasitic capacitance of the address control circuit 13 supplied with the internal power supply voltage $VDL_3$ is 3000 pF; and the combined parasitic capacitance of the data control circuit 14 and the power-on reset circuit 15, which are respectively supplied with the internal power supply voltages $VDL_4$ and $VDL_P$, is 2000 pF. It is also assumed that each parasitic capacitance is raised using a constant current of 1 mA for ease of explanation. FIG. 18 is a voltage waveform chart showing a rise of each of the internal power supply voltages $VDL_1$ to $VDL_4$ and VDLP, which is obtained based on the characteristic diagram shown in FIG. 17. Note that FIG. 18 also shows a change of the initialization signal RST from the power-on reset circuit 15.

In FIG. 18, the circuits 11, 14, and 15 receiving the internal power supply voltages $VDL_1$, $VDL_4$, and $VDL_P$, respectively, have a small parasitic capacitance. Accordingly, the levels of the internal power supply voltages $VDL_1$, $VDL_4$, and $VDL_P$ rise first. Meanwhile, the circuits 12 and 13 receiving the internal power supply voltages $VDL_2$ and $VDL_3$, respectively, have a large parasitic capacitance. Accordingly, the levels of the internal power supply voltages $VDL_2$ and $VDL_3$ rise with a delay.

In this case, when the internal power supply voltage $VDL_P$ supplied to the power-on reset circuit 15 rises up to 0.8 V which is the inversion level (at a time T1), the initialization signal RST from the power-on reset circuit 15 changes from low level to high level. Then, each of the functional circuits 11, 12, 13, and 14 performs the initialization operation in response to the initialization signal RST of high level.

Meanwhile, the internal power supply voltages $VDL_2$ and $VDL_3$ rise only to 0.32 V and 0.53 V, respectively, at the time T1. If the initialization operation is finished when the internal power supply voltages $VDL_2$ and $VDL_3$ are at low level, the initialization operation of each of the command control circuit 12 and the address control circuit 13, which receive the internal power supply voltages $VDL_2$ and $VDL_3$, respectively, is not executed normally. This leads to a problem of causing a malfunction in the operation after power-on.

As a countermeasure for preventing a malfunction from being caused in the initialization operation at power-on, FIG. 4 of Japanese Unexamined Patent Application Publication No. 09-153777, for example, is disclosed as the related art shown in FIG. 19.

In the configuration disclosed in Japanese Unexamined Patent Application Publication No. 09-153777, a first internal voltage generating circuit 18A and a power-on reset circuit 15A are provided to a peripheral circuit 19A, and a second internal voltage generating circuit 18B and a power-on reset circuit 15B are provided to a peripheral circuit 19B.

The power-on reset circuits 15A and 15B are provided to the functional circuits 19A and 19B, respectively, in the above-mentioned manner, and thus the initialization operation is carried out for each of the functional circuits 19A and 19B. Accordingly, all the functional circuits can be normally initialized without the effect of the parasitic capacitance or the like of the functional circuits 19A and 19B.

SUMMARY

We have now discovered that there arises a problem when simply adopting the configuration disclosed in Japanese Unexamined Patent Application Publication No. 09-153777.

For example, FIG. 20 shows a configuration in which the technique disclosed in Japanese Unexamined Patent Application Publication No. 09-153777 is applied to the configuration shown in FIG. 12.

Specifically, power-on reset circuits 15A to 15D are added to the data control circuit 11, the command control circuit 12, the address control circuit 13, and the data control circuit 14, respectively.

In this case, as shown in FIG. 20, the plurality of power-on reset circuits 15A to 15D is required. This causes a problem of an increase in the number of circuits to be arranged and lines. There also arises a problem that the time and labor for evaluating and optimizing the characteristics of the power-on reset circuits 15A to 15D are increased several times when an operation check is performed on each product. Further, the initialization timings of the data control circuit 11, the command control circuit 12, the address control circuit 13, and the data control circuit 14 are different from each other. Accordingly, when signals are exchanged between the functional circuits, it is difficult to ensure that the initialization operation of the entire semiconductor device can be completed normally.

A first exemplary aspect of the present invention is a semiconductor device including: a step-down circuit group including a plurality of step-down circuits that step down an external power supply voltage to a predetermined voltage; a plurality of functional circuits that require a reset operation upon power-on; and a power-on reset circuit that outputs a reset command to the plurality of functional circuits, when an internal power supply voltage supplied from the step-down circuit group exceeds a voltage level necessary for an initialization operation. In the semiconductor device according to the first exemplary aspect of the invention, the plurality of step-down circuits of the step-down circuit group are classified into a startup operating step-down circuit group that performs a step-down operation from power-on to supply the internal power supply voltage, and a startup non-operating step-down circuit group that stops operation upon power-on to interrupt supply of the internal power supply voltage. Further, the startup non-operating step-down circuit group includes the plurality of step-down circuits sequentially selected from one having a shortest wiring distance from the power-on reset circuit.

In this configuration, the step-down circuits provided at positions near the power-on reset circuit stop operating upon power-on. Accordingly, the internal power supply voltage supplied to the power-on reset circuit has a value smaller than that of the internal power supply voltage supplied to other functional circuits. As a result, the internal power supply voltage supplied to the power-on reset circuit rises at the latest timing. Therefore, when the power-on reset circuit detects that the internal power supply voltage exceeds the voltage level necessary for the initialization operation, the voltages of other functional circuits rise to a sufficiently high level. As a result, when the power-on reset circuit issues a reset command, the functional circuits can reliably execute the initialization operation.

A second exemplary aspect of the present invention is a semiconductor device including: a step-down circuit group including a plurality of step-down circuits that step down an external power supply voltage to a predetermined voltage; a plurality of functional circuits that require a reset operation upon power-on; and a power-on reset circuit that outputs a reset command to the plurality of functional circuits, when an internal power supply voltage supplied from the step-down circuit group exceeds a voltage level necessary for an initialization operation. In the semiconductor device according to the second exemplary aspect of the invention, the plurality of step-down circuits of the step-down circuit group are classified into a startup operating step-down circuit group that performs a step-down operation from power-on to supply the internal power supply voltage, and a startup non-operating step-down circuit group that stops operation upon power-on to interrupt supply of the internal power supply voltage. Further, the power-on reset circuit has a longest wiring distance from the step-down circuits included in the startup operating step-down circuit group, compared to the plurality of functional circuits.

In this configuration, the wiring distance from the step-down circuit operating upon power-on is longest. Accordingly, the internal power supply voltage supplied to the power-on reset circuit has a value smaller than that of the internal power supply voltage supplied to other functional circuits. Therefore, when the power-on reset circuit issues a reset command, the functional circuits can reliably execute the initialization operation.

A third exemplary aspect of the present invention is a semiconductor device including: a step-down circuit group including a plurality of step-down circuits that step down an external power supply voltage to a predetermined voltage; a plurality of functional circuits that require a reset operation upon power-on; and a power-on reset circuit that outputs a reset command to the plurality of functional circuits, when an internal power supply voltage supplied from the step-down circuit group exceeds a voltage level necessary for an initialization operation. In the semiconductor device according to the third exemplary aspect of the invention, the plurality of step-down circuits of the step-down circuit group are classified into a startup operating step-down circuit group that performs a step-down operation from power-on to supply the internal power supply voltage, and a startup non-operating step-down circuit group that stops operation upon power-on to interrupt supply of the internal power supply voltage. Further, the startup non-operating step-down circuit group includes the plurality of step-down circuits sequentially selected from one having a shortest wiring distance from the power-on reset circuit. Furthermore, the power-on reset circuit has a longest wiring distance from the step-down circuits included in the startup operating step-down circuit group, compared to the plurality of functional circuits.

In this configuration, operations and effects similar to those of the configuration according to the above exemplary aspects of the present invention can be obtained. That is, when the power-on reset circuit issues a reset command, the functional circuits can reliably execute the initialization operation, thereby stabilizing the operation.

A fourth exemplary aspect of the present invention is a method of supplying internal power to a semiconductor device, the semiconductor device including: a step-down circuit group including a plurality of step-down circuits that step down an external power supply voltage to a predetermined voltage; a plurality of functional circuits that require a reset operation upon power-on; and a power-on reset circuit that outputs a reset command to the plurality of functional circuits, when an internal power supply voltage supplied from the step-down circuit group exceeds a voltage level necessary for an initialization operation, the method including causing the plurality of step-down circuits sequentially selected from one having a shortest wiring distance from the power-on reset circuit, to stop supplying the internal power supply voltage during a period from power-on to output of the reset command.

In this configuration, operations and effects similar to those of the configuration according to the above exemplary aspects of the present invention can be obtained.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

Figure 1:
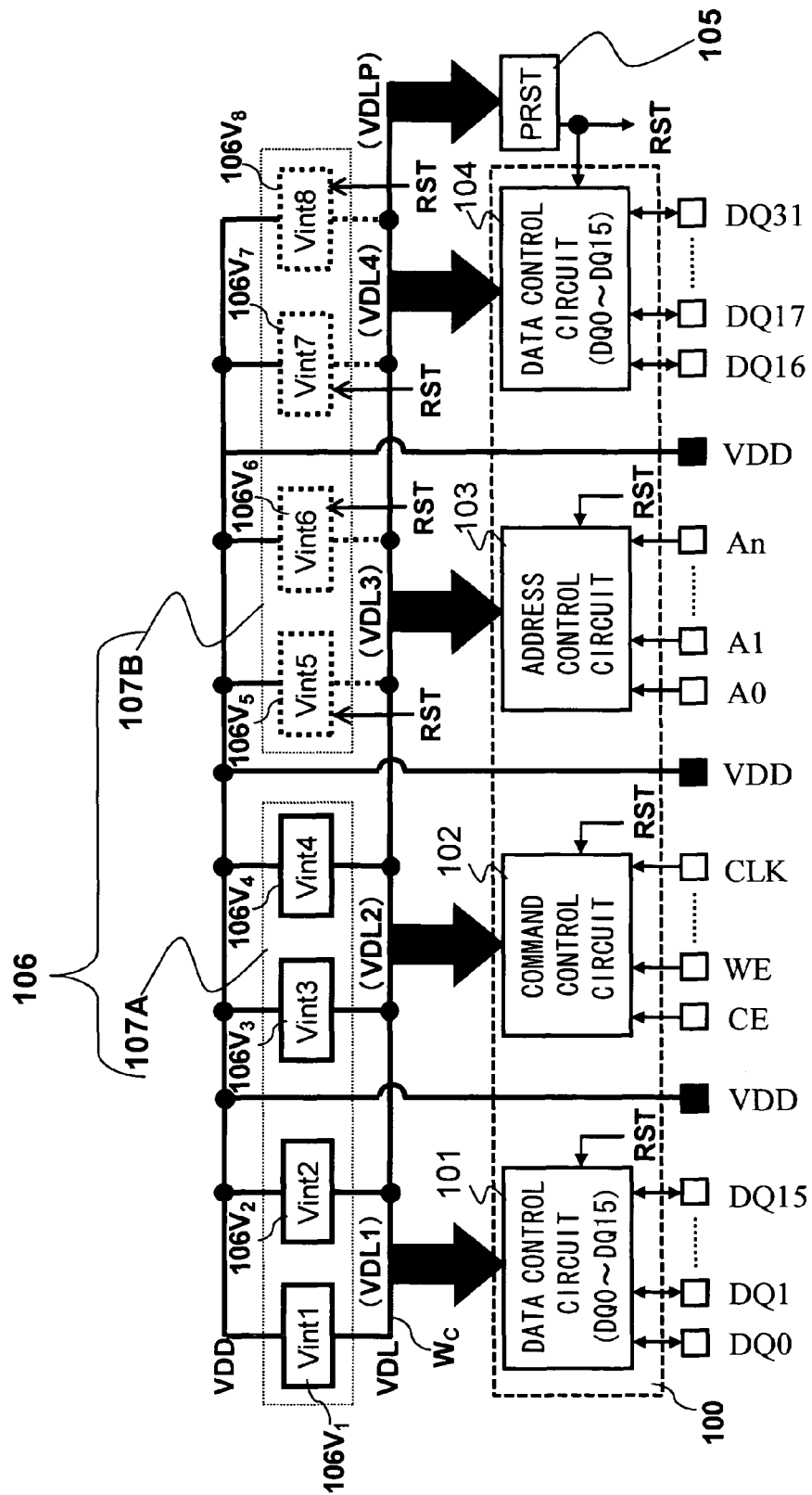
FIG. 1 is a block diagram showing the configuration of a first exemplary embodiment of the present invention.

Exemplary embodiments of the present invention are illustrated and described with reference to reference symbols given to the constituent elements in the drawings.

First Exemplary Embodiment

A semiconductor device according to a first exemplary embodiment of the present invention will be described.

FIG. 1 is a block diagram showing the configuration of the semiconductor device according to the first exemplary embodiment.

Figure 12:
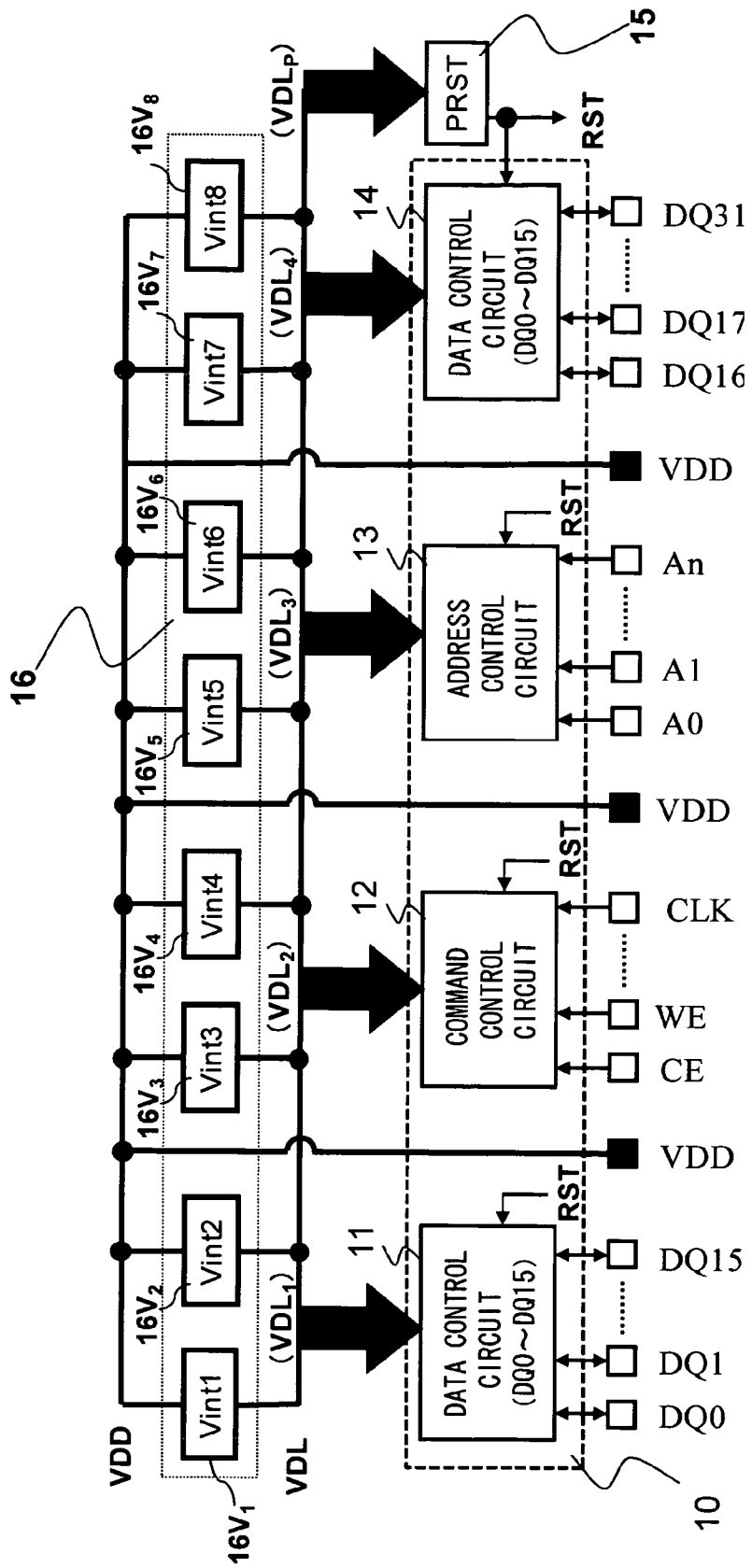
FIG. 12 is a block diagram showing a circuit configuration for supplying voltage to peripheral circuits.

A description of components in FIG. 1 which are similar to those in FIG. 12 is herein omitted.

This exemplary embodiment has following features. That is, a plurality of step-down circuits $106V_1$ to $106V_8$ is classified in terms of operation mode into a startup operating step-down circuit group 107A and a startup non-operating step-down circuit group 107B.

Further, in a period in which a power-on reset circuit 105 issues an initialization operation (a period in which RST=low level) during a power-on process, the operation of the startup non-operating step-down circuit group 107B is stopped.

Referring to FIG. 1, description is made of the arrangement of the step-down circuits $106V_1$ to $106V_8$, peripheral circuits 101 to 104, and the power-on reset circuit 105.

A step-down circuit group 106 includes the eight step-down circuits $106V_1$ to $106V_8$ that generate internal power supply voltages Vint1 to Vint8, respectively.

The eight step-down circuits $106V_1$ to $106V_8$ are divided into two groups.

Specifically, the eight step-down circuits $106V_1$ to $106V_8$ are classified into the startup operating step-down circuit group 107A and the startup non-operating step-down circuit group 107B.

The step-down circuits $106V_1$, $106V_2$, $106V_3$, $106V_4$, $106V_5$, $106V_6$, $106V_7$, and $106V_8$ are arranged in the stated order from the left side of FIG. 1.

A group of the step-down circuits $106V_1$, $106V_2$, $106V_3$, and $106V_4$, which are shown on the left side of FIG. 1, is classified as the startup operating step-down circuit group 107A.

A group of the step-down circuits $106V_5$, $106V_6$, $106V_7$, and $106V_8$, which are shown on the right side of FIG. 1, is classified as the startup non-operating step-down circuit group 107B.

Referring to FIG. 1, description is made of the layout of peripheral circuits 100 and the power-on reset circuit 105.

The data control circuit 101, the command control circuit 102, the address control circuit 103, and the data control circuit 104 are arranged in the stated order from the left side of FIG. 1, and the power-on reset circuit 105 is disposed on the right side of the peripheral circuits 100.

In other words, among the step-down circuits $106V_1$ to $106V_8$, the step-down circuits $106V_5$ to $106V_8$, which are arranged on the side near the power-on reset circuit 105, are classified as the startup non-operating step-down circuit group 107B.

The step-down circuits $106V_1$ to $106V_4$, which are arranged on the side far from the power-on reset circuit 105, are classified as the startup operating step-down circuit group 107A.

As a result, the power-on reset circuit 105 is disposed at a position where the wiring distance from the startup operating step-down circuit group 107A is longest.

Figure 15:
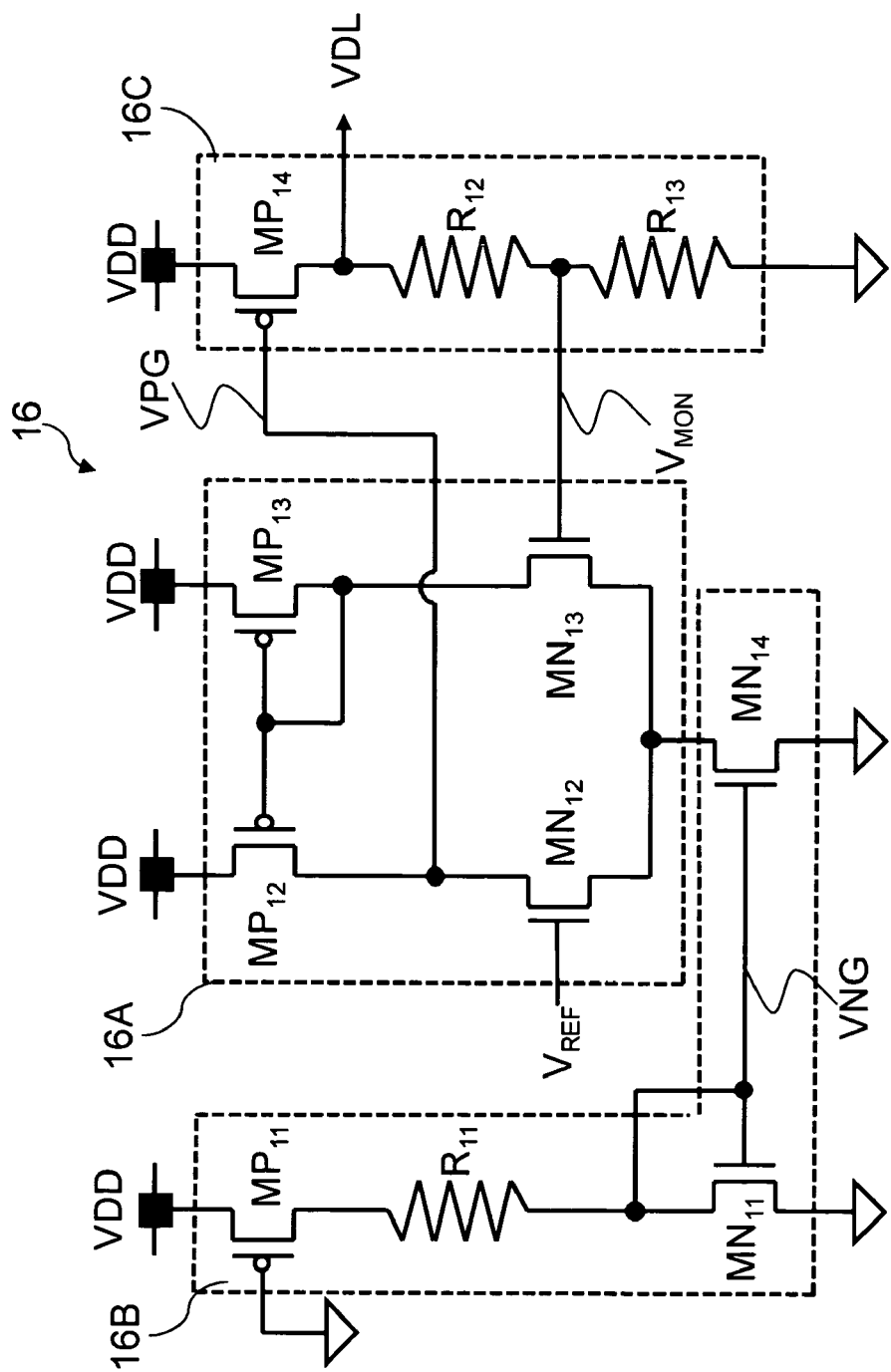
FIG. 15 is a diagram showing a circuit configuration of step-down circuits of the related art.
Figure 16:
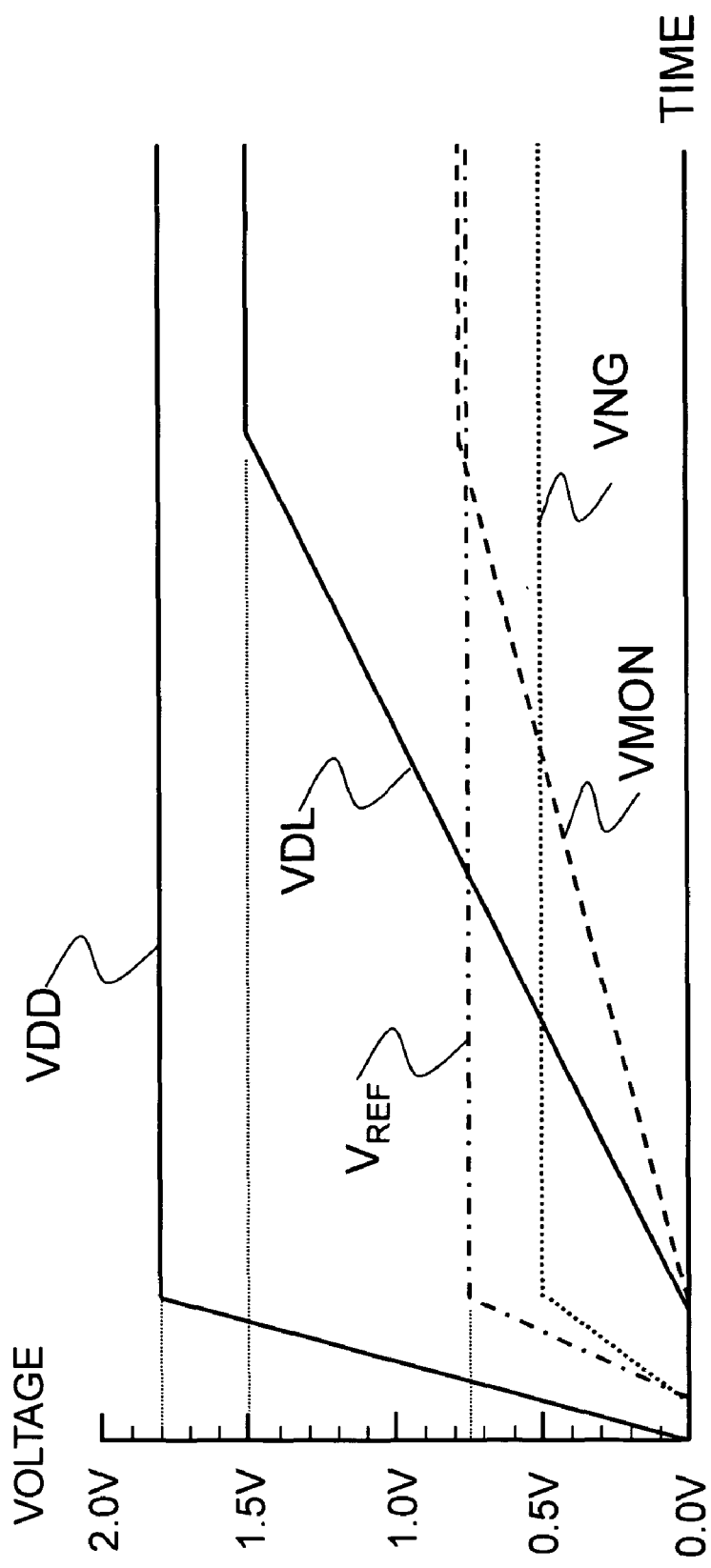
FIG. 16 is a voltage waveform chart illustrating operation of the step-down circuits.
Figure 17:
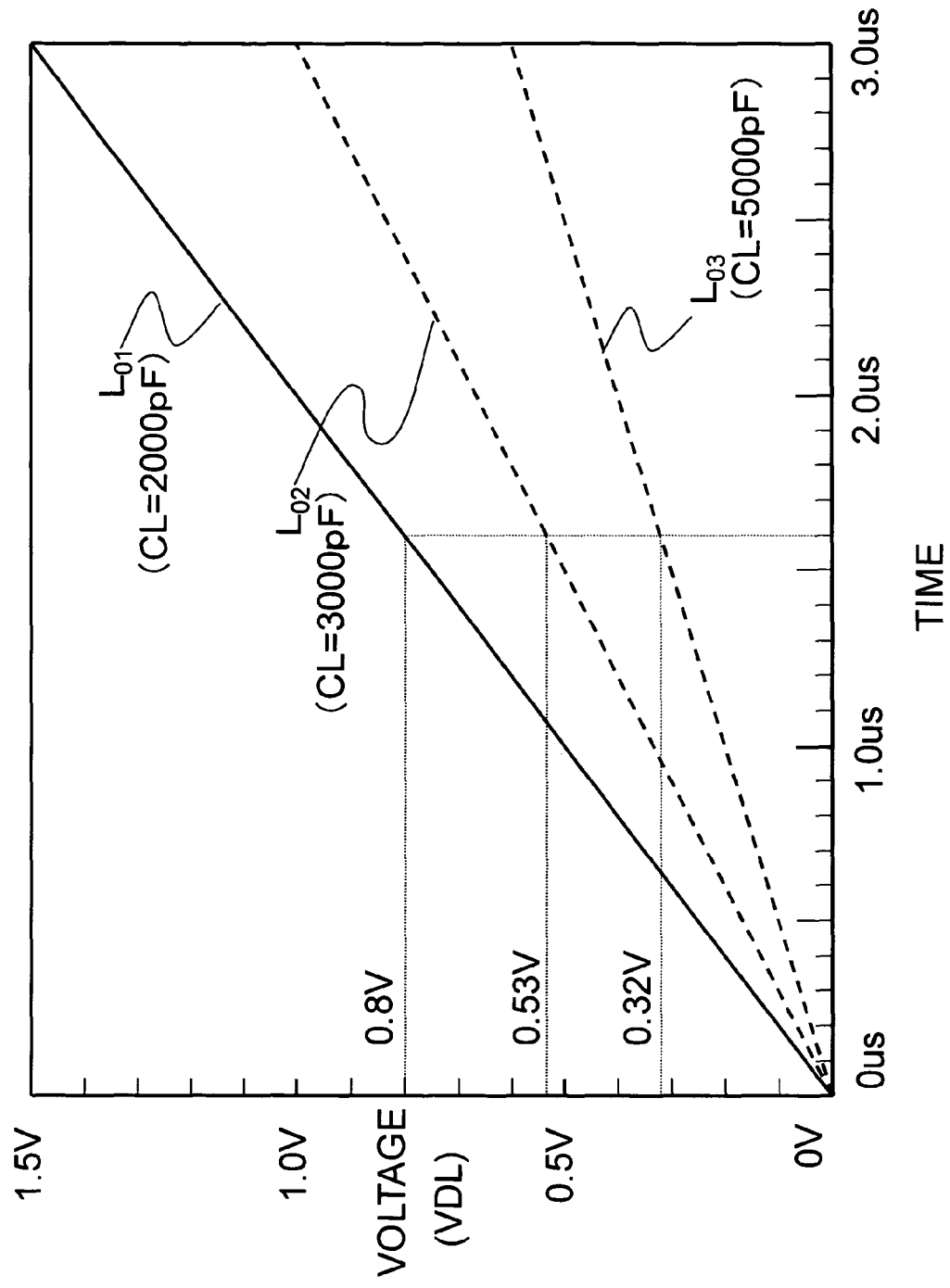
FIG. 17 is a graph showing effects of a parasitic capacitance on a rise of an internal power supply voltage VDL during a power-on process.
Figure 18:
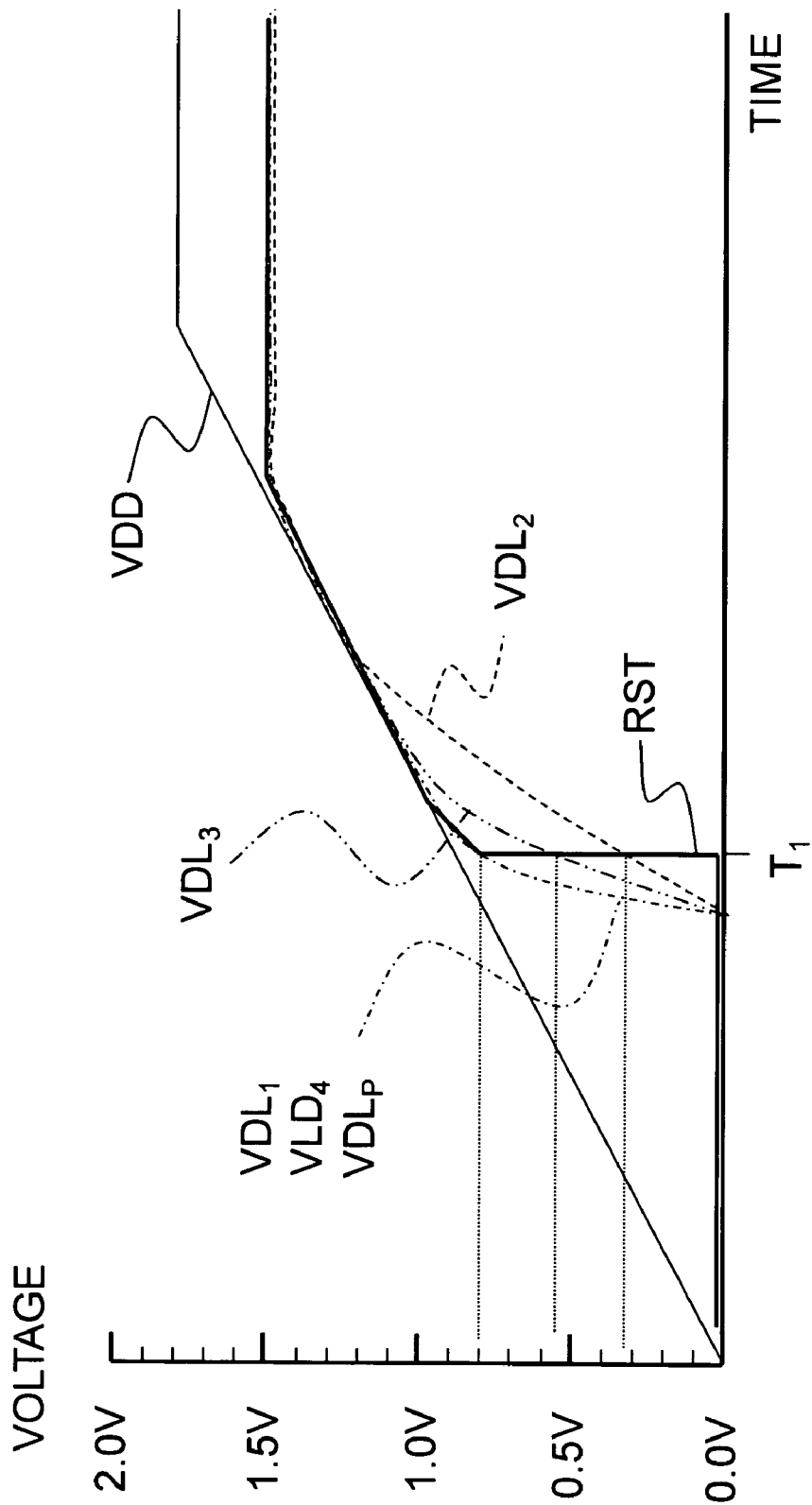
FIG. 18 is a diagram showing a rise of each of internal power supply voltages (VDL$_1$ to VDL$_4$, and VDL$_P$)
Figure 19:
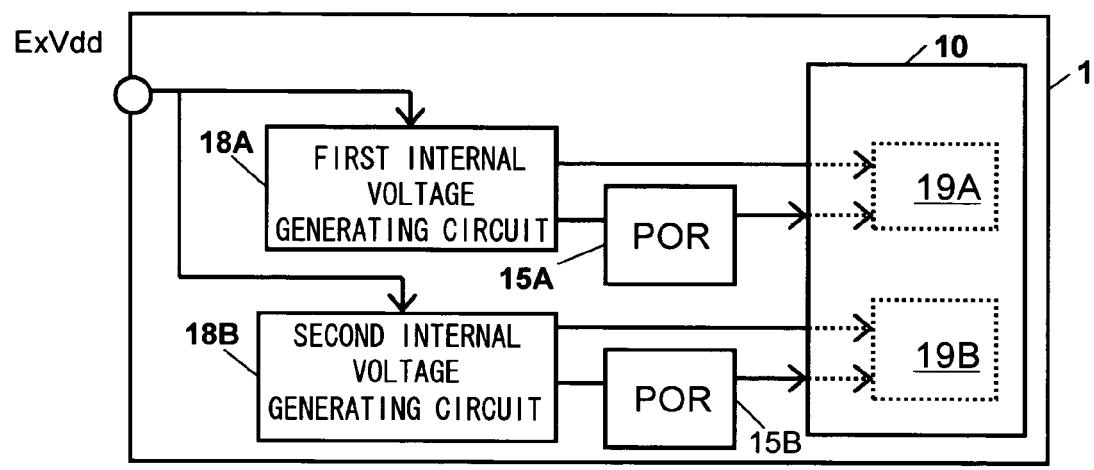
FIG. 19 is a diagram illustrating the layout of a power-on reset circuit of the related art.
Figure 20:
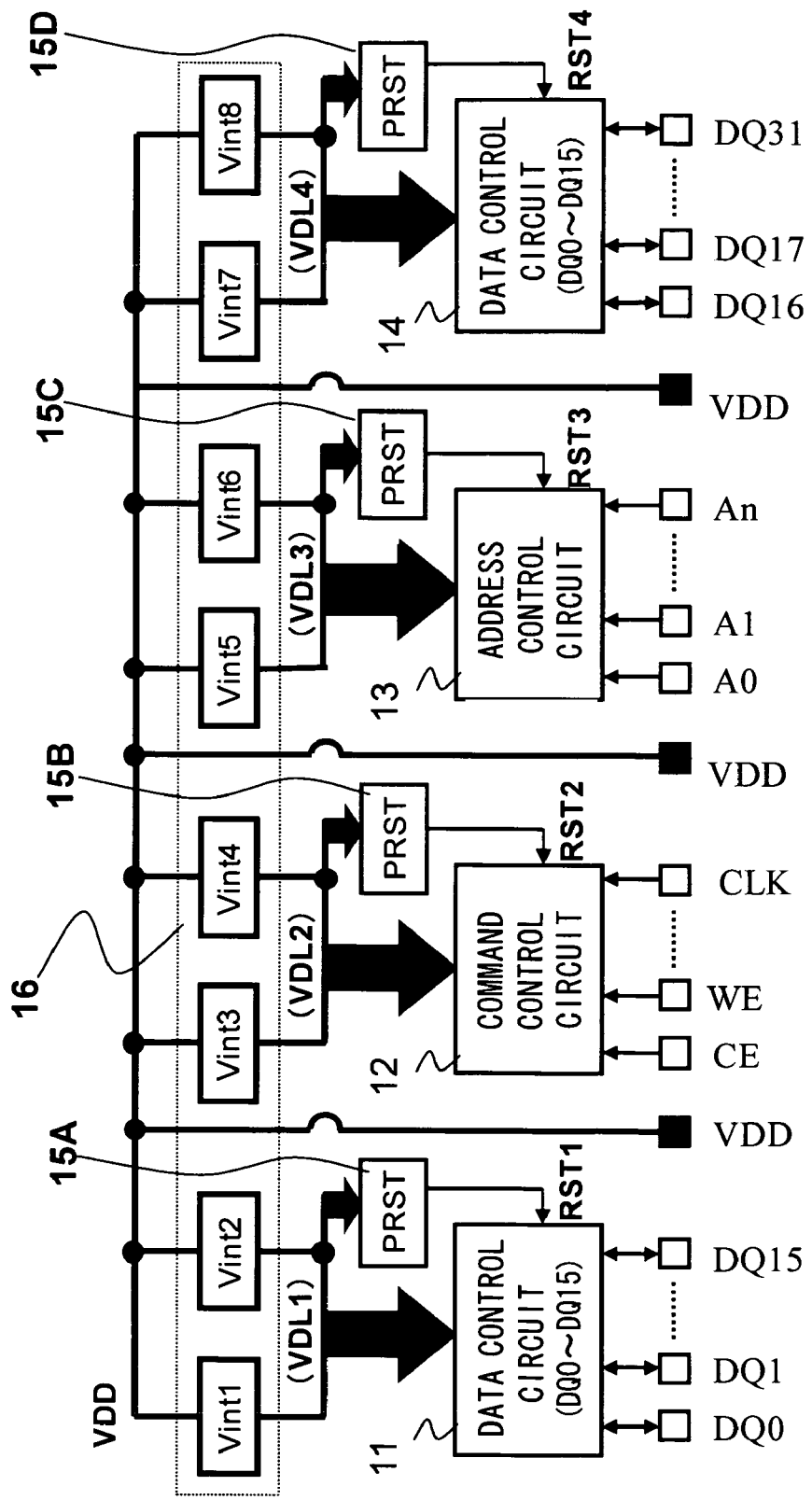
FIG. 20 is a diagram illustrating a problem inherent in the related art.

In this case, the step-down circuits $106V_1$ to $106V_4$ included in the startup operating step-down circuit group 107A can adopt a known configuration of a step-down circuit as shown in FIG. 15, and are configured to step down a power supply voltage VDD, which is supplied from the outside, according to a reference voltage $V_{REF}$ and output an internal power supply voltage (VDL).

Further, the configuration of the peripheral circuits 100 and the configuration of each of the data control circuit 101, the command control circuit 102, the address control circuit 103, and the data control circuit 104, which constitute the internal structure of the peripheral circuits 100, are not particularly limited.

Figure 13:
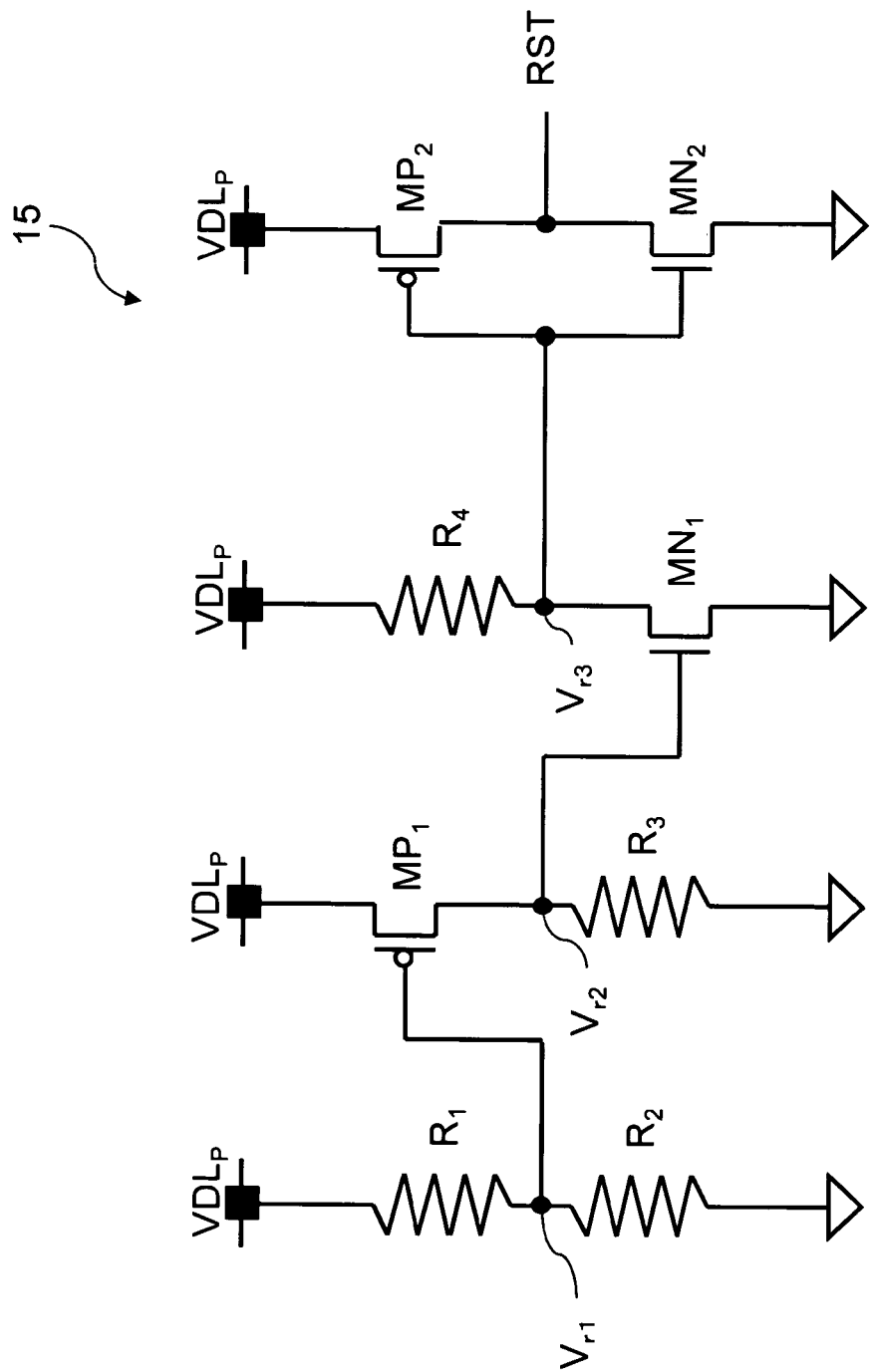
FIG. 13 is a circuit diagram showing a power-on reset circuit.
Figure 14:
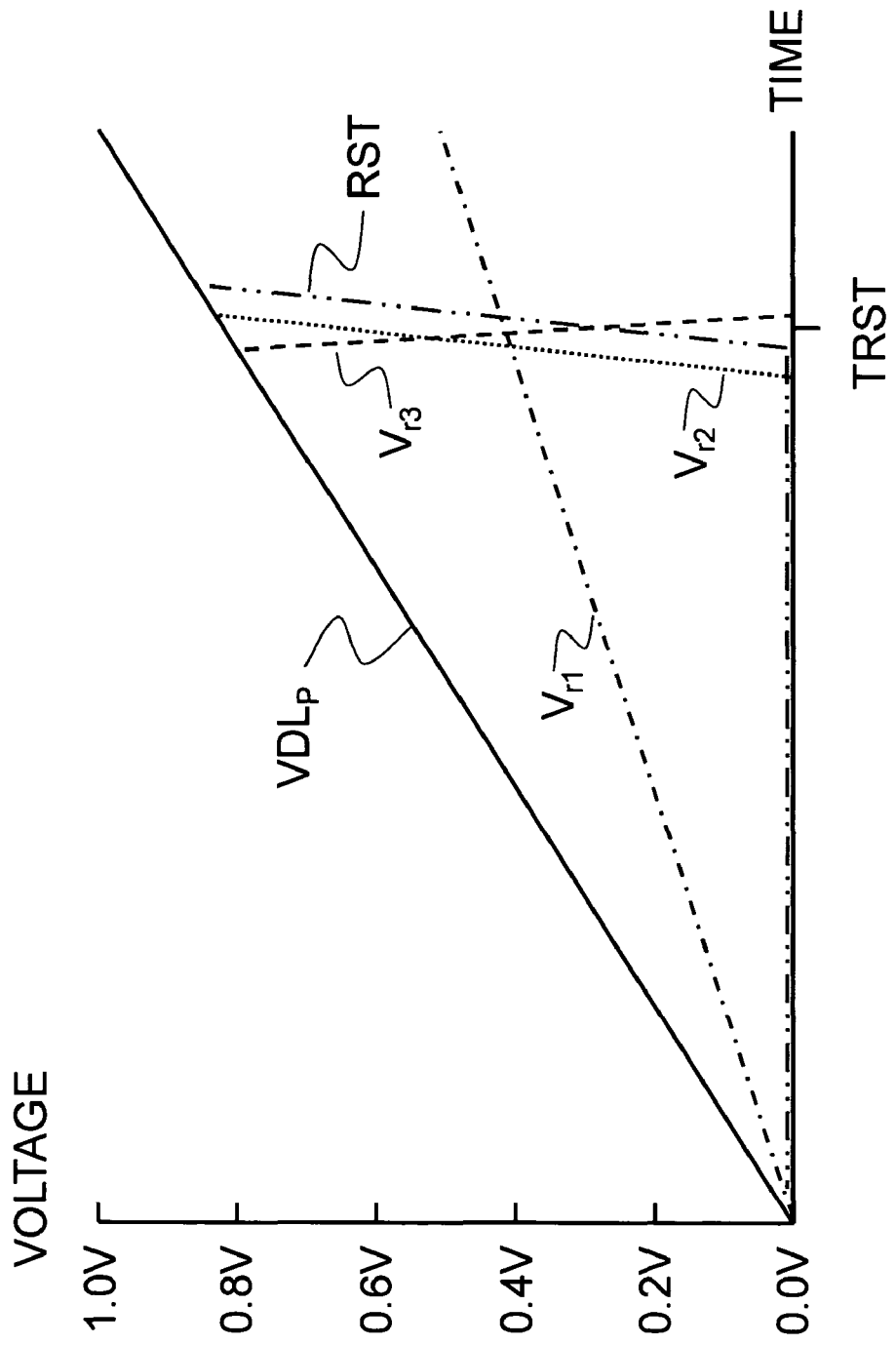
FIG. 14 is a voltage waveform chart illustrating operation of a power-on reset circuit 15.

A known configuration that has been described with reference to FIG. 13 can be adopted for the power-on reset circuit 105. Before an internal power supply voltage $VDL_P$, which is supplied to the power-on reset circuit 105, exceeds a predetermined inversion level, an initialization signal RST is set to a low level. When the internal power supply voltage VDL supplied to the power-on reset circuit 105 exceeds the predetermined inversion level, the initialization signal RST is set to a high level.

Meanwhile, the step-down circuits $106V_5$ to $106V_8$ included in the startup non-operating step-down circuit group 107B stop operation during a period in which the power-on reset circuit 105 is issuing the initialization operation (period in which RST=low level), and start operation when the power-on reset circuit 105 completes the initialization operation and sets the RST signal to the high level.

Figure 2:
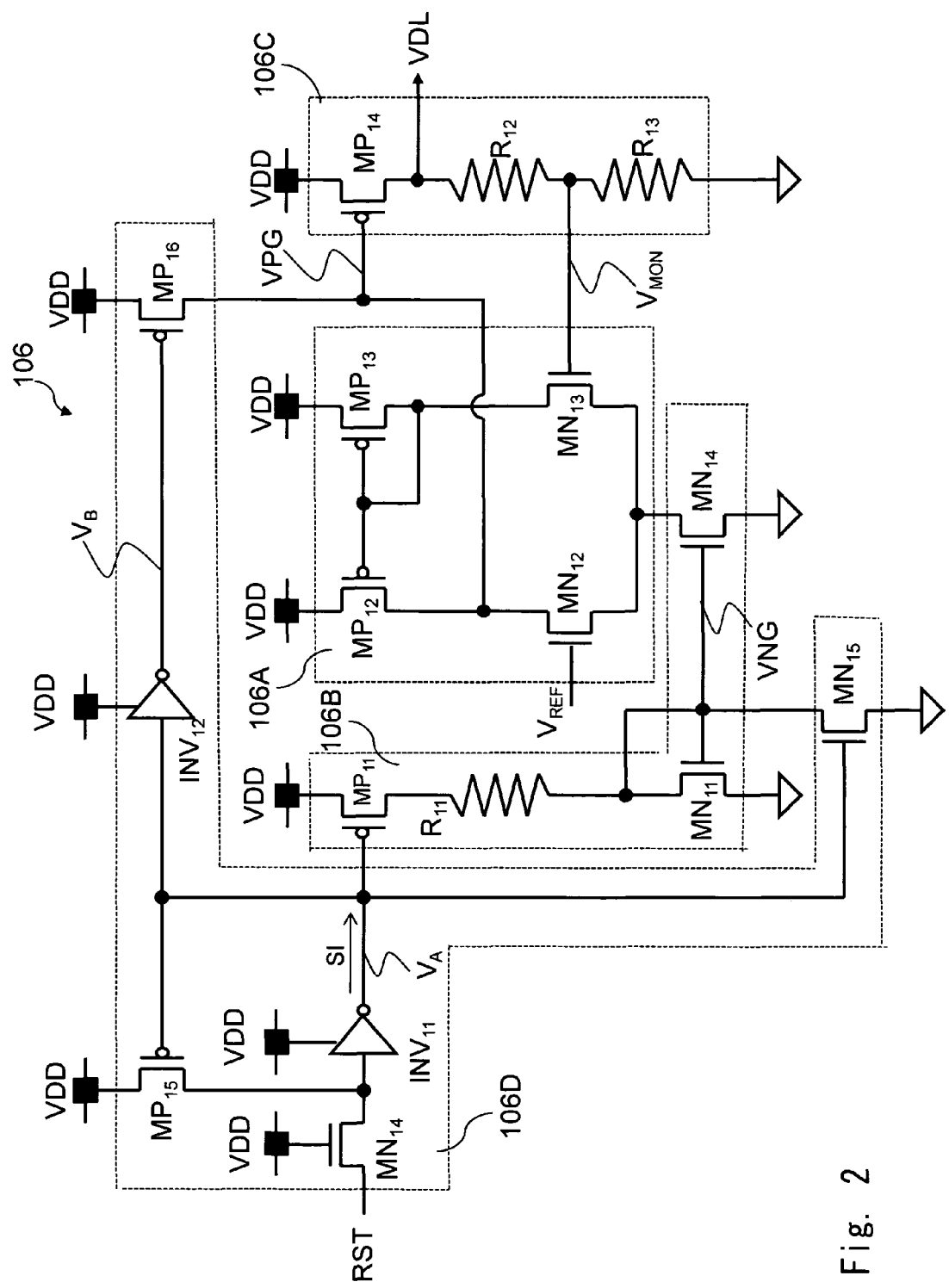
FIG. 2 is a circuit diagram showing the internal structure of a step-down circuit of a startup non-operating step-down circuit group.

FIG. 2 is a circuit diagram showing the internal structure of one of the step-down circuits $106V_5$ to $106V_8$ of the startup non-operating step-down circuit group 107B.

In each of the step-down circuits $106V_5$ to $106V_8$ included in the startup non-operating step-down circuit group 107B, n-type MOSFETs $MN_{14}$ and $MN_{15}$, p-type MOSFETs $MP_{15}$ and $MP_{16}$, and inverters $INV_{11}$ and $INV_{12}$ are added to a step-down circuit 16 shown in FIG. 15, so as to cause the step-down circuits $106V_5$ to $106V_8$ to stop operation in response to the initialization signal RST output from the power-on reset circuit 105.

In other words, like the step-down circuit 16 shown in FIG. 15, each of the step-down circuits $106V_5$ to $106V_8$ included in the startup non-operating step-down circuit group 107B includes a differential circuit section 106A, a current control section 106B, a voltage supply section 106C, and a standby control section 106D that controls setting and releasing of a standby state in response to the initialization signal RST from the power-on reset circuit 105.

The standby control section 106D controls ON/OFF of an operating current of the differential circuit section 106A in response to the initialization signal RST from the power-on reset circuit 105, and cuts off a leak current of the p-type MOSFET $MP_{14}$ serving as an output transistor of the voltage supply section 106C. In the standby control section 106D, the initialization signal RST received from the power-on reset circuit 105 through the n-type MOSFET $MN_{14}$ passes through the inverter $INV_{ii}$ and is obtained as an inversion control signal SI.

In this case, the inversion control signal SI is branched into three signals, and one of the branched signals is applied to the gate of the p-type MOSFET $MP_{11}$ of the current control section 106B.

Further, the signal branched from the inversion control signal SI is applied to the gate of the n-type MOSFET $MN_{15}$ which is disposed between a node between the gates of the n-type MOSFETs $MN_{11}$ and $MN_{14}$ of the current control section 106B and a ground GND.

Furthermore, the signal branched from the inversion control signal SI is applied to the gate of the p-type MOSFET $MP_{16}$ through the inverter $INV_{12}$. The drain output of the p-type MOSFET $MP_{16}$ is applied to the gate of the p-type MOSFET $MP_{14}$ serving as the output transistor of the voltage supply section 106C.

The p-type MOSFET $MP_{15}$ is provided on a path through which a node between the n-type MOSFET $MN_{14}$ and the inverter $INV_{11}$ is connected to the external power supply VDD, and the output from the inverter $INV_{ii}$ is applied to the gate of the p-type MOSFET $MP_{15}$.

Figure 3:
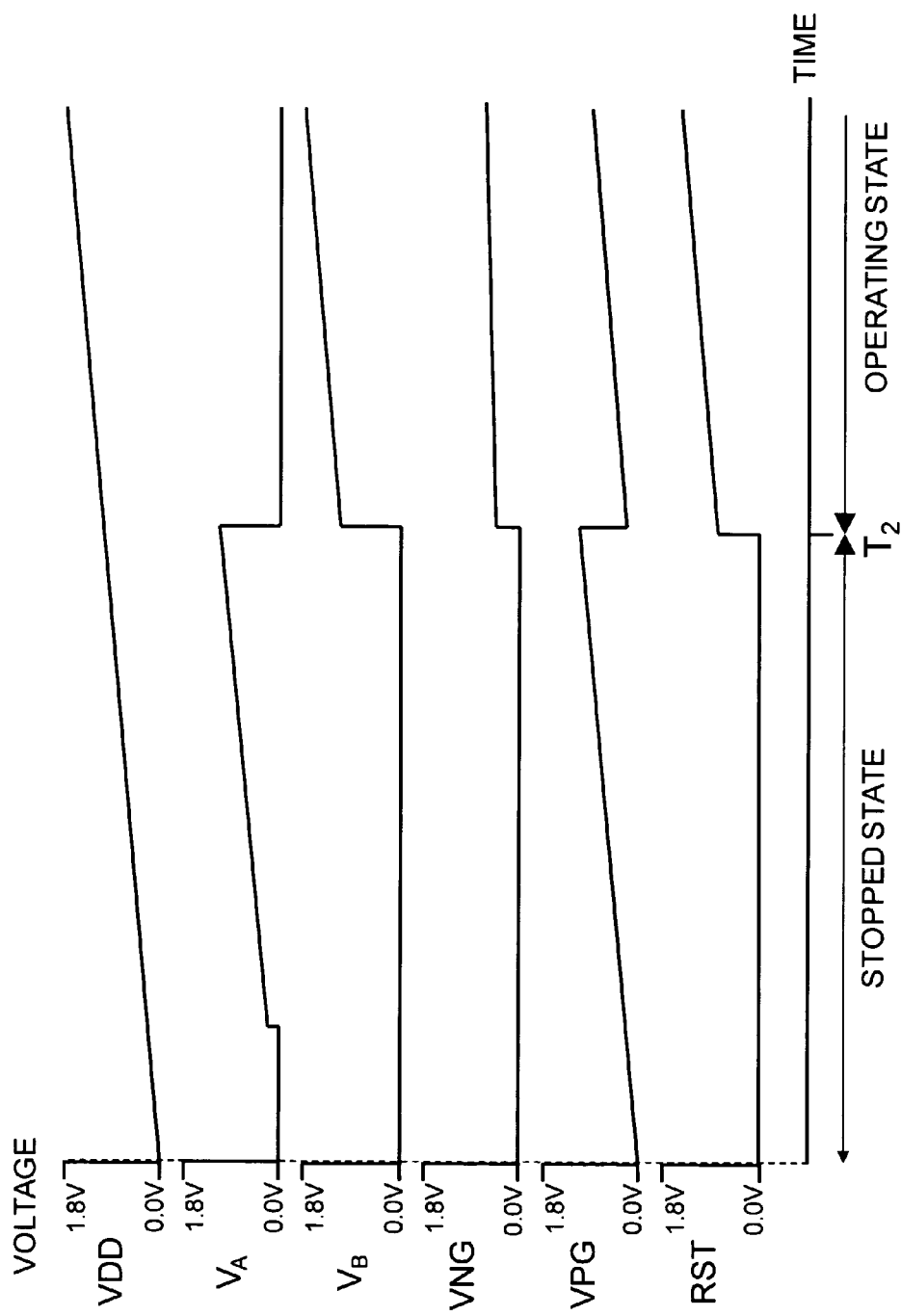
FIG. 3 is a voltage waveform chart illustrating operation of a step down circuit included in the startup non-operating step-down circuit group.

FIG. 3 is a voltage waveform chart illustrating operation of the step-down circuits ($106V_5$ to $106V_8$) included in the startup non-operating step-down circuit group 107B.

The operation will be described with reference to the voltage waveform chart of FIG. 3.

For ease of explanation, in FIG. 2, the voltage of the inversion control signal SI which is the output from the inverter $INV_{11}$ is represented by $V_A$; the voltage level of the output of the inverter $INV_{12}$ is represented by $V_B$; the voltage applied to the gate of the n-type MOSFET $MN_{14}$ is represented by VNG; and the voltage applied to the gate of the p-type MOSFET $MP_{14}$ is represented by VPG.

While the external power supply voltage VDD gradually rises during the power-on process, the step-down circuits $106V_1$ to $106V_4$ included in the startup operating step-down circuit group 107A gradually increase the outputs of the internal power supplies (corresponding to $VDL_1$ and $VDL_2$ shown in FIG. 1).

In this case, it is assumed that the internal power supply voltage $VDL_P$ supplied to the power-on reset circuit 105 at a time $T_2$ exceeds the predetermined inversion level.

During the power-on process, the external power supply voltage VDD gradually rises from power-on.

The initialization signal RST starts from the low level. During a period prior to the time $T_2$ when the initialization signal RST is at low level, the level of the output $V_A$ obtained after passing through the inverter $INV_{11}$ is high, and the level of the output $V_B$ obtained after further passing through the inverter $INV_{12}$ is low.

In this case, since the output level $V_A$ is high, the p-type MOSFET $MP_{11}$ is rendered non-conductive, while the n-type MOSFET $MN_{15}$ is rendered conductive.

Then, the output level VNG becomes low because the voltage VNG is connected to the GND, and the n-type MOSFET $MN_{14}$ is made non-conductive to interrupt the operating current of the differential circuit section 106A. As a result, the differential circuit section 106A is put into an operation stopped state.

Further, since the output level $V_B$ is low, the p-type MOSFET $MP_{16}$ is rendered conductive.

Then, the output VPG becomes high level, with the result that the p-type MOSFET $MP_{14}$ serving as the output transistor of the voltage supply section 106C is rendered non-conductive.

Accordingly, during the period (prior to the time $T_2$) in which the initialization signal RST from the power-on reset circuit 105 is at low level, the step-down circuits ($106V_5$ to $106V_8$) included in the startup non-operating step-down circuit group 107B are maintained in their operation stopped state.

Next, description is made of a case where the initialization signal RST from the power-on reset circuit 105 becomes high level after the time $T_2$.

When the initialization signal RST from the power-on reset circuit becomes high level, the voltage $V_A$ becomes low level.

In this case, the p-type MOSFET $MP_{11}$ is turned on, while the n-type MOSFET $MN_{15}$ is turned off.

Then, the n-type MOSFET $MN_{14}$ is turned on, with the result that the differential circuit section 106A starts operation.

Further, since the output level $V_B$ becomes high, the p-type MOSFET $MP_{16}$ is in an OFF state.

Accordingly, when the initialization signal RST from the power-on reset circuit 105 becomes high level (after the time $T_2$), the step-down circuits ($106V_5$ to $106V_8$) included in the startup non-operating step-down circuit group 107B are in a normal operating state, and output the internal power supply voltage VDL according to the reference voltage $V_{REF}$.

Figure 4:
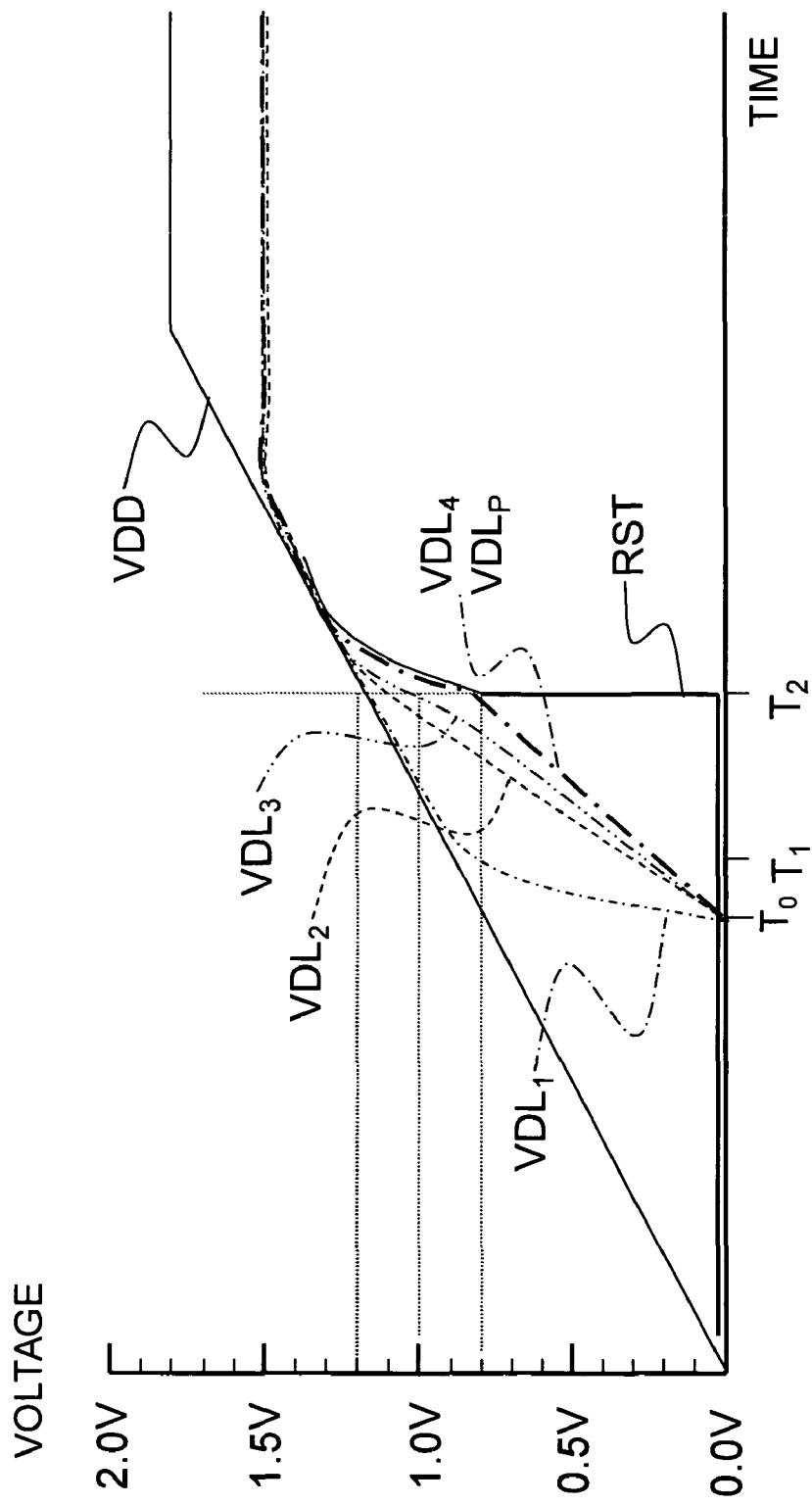
FIG. 4 is a voltage waveform chart illustrating operation of the first exemplary embodiment.

Referring next to the voltage waveform chart of FIG. 4, description is made of the operation (method of supplying internal power) of the semiconductor device shown in FIG. 1.

As described in the "Description of Related Art" section, voltages of the internal power supplies VDL, which are supplied to the data control circuit 101, the command control circuit 102, the address control circuit 103, the data control circuit 104, and the power-on reset circuit 105, are respectively represented by $VDL_1$, $VDL_2$, $VDL_3$, $VDL_4$, and $VDL_P$.

After power-on, the internal power supplies generated by the step-down circuits $106V_1$ to $106V_4$ start to rise from a time $T_0$. At this time point, however, the initialization signal RST which is the output of the power-on reset circuit 105 is at low level.

Accordingly, the step-down circuits $106V_5$ to $106V_8$ included in the startup non-operating step-down circuit group 107B stop operation, and only the step-down circuits $106V_1$ to $106V_4$ included in the startup operating step-down circuit group 107A operate to increase the internal power supplies.

Thus, the voltages ($VDL_3$, $VDL_4$, and $VDL_P$) are respectively supplied to the address control circuit 103, the data control circuit 104, and the power-on reset circuit 105, which are disposed near the startup non-operating step-down circuit group 107B as shown in FIG. 1, through a basic power supply line $W_C$.

In particular, the internal power supply voltage $VDL_P$ to be supplied to the power-on reset circuit 105 travels the longest distance through the power supply line $W_C$.

Accordingly, the voltage levels of the internal power supply voltages ($VDL_1$, $VDL_2$, $VDL_3$, $VDL_4$, and $VDL_P$) respectively supplied to the circuits 101 to 105 rise, while maintaining the following relation.

$$(VDL_1 \text{ or } VDL_2) > VDL_3 > VDL_4 > VDL_P$$

Note that FIG. 4 illustrates the relation assuming that the effect of a parasitic capacitance on the internal power supply voltage $VDL_P$ is extremely small and $VDL_4 = VDL_P$ is satisfied.

The internal voltage supplied from the startup operating step-down circuit group 107A further rises. Then, at the time $T_2$, the internal power supply voltage $VDL_P$ of the power-on reset circuit 105 rises up to 0.8 V.

Then, the initialization signal RST from the power-on reset circuit 105 changes from low level to high level, thereby supplying a reset command to each of the circuits 101 to 104.

In this case, the internal voltage $VDL_P$ supplied to the power-on reset circuit 105 rises last, and thus the internal power supply voltages $VDL_1$ to $VDL_4$ respectively supplied to the circuits 101 to 104 exceed the voltage (0.8 V) necessary for the initialization operation.

Accordingly, the internal power supply voltages $VDL_1$ to $VDL_4$ respectively supplied to the circuits 101 to 104 in this state ensure that the initialization operation of each of the circuits 101 to 104 is completed normally.

Further, as described above with reference to FIGS. 2 and 3, when the initialization signal RST from the power-on reset circuit 105 becomes high level, the step-down circuits $106V_5$ to $106V_8$ of the startup non-operating step-down circuit group 107B changes from the stopped state to the operating state.

Accordingly, after the time $T_2$, a desired consumption current required for the peripheral circuits 101 to 104 to execute the reset operation and continuous operation thereafter can be supplied.

According to the first exemplary embodiment having the above-mentioned configuration, the following effects can be obtained.

(1) In this exemplary embodiment, there is employed a configuration in which the step-down circuit group 106 is classified into the startup operating step-down circuit group 107A and the startup non-operating step-down circuit group 107B, and the step-down circuits $106V_5$ to $196V_8$ of the startup non-operating step-down circuit group 107B, which is disposed on the side of the power-on reset circuit 105, are caused to stop operation upon startup.

As a result, the voltage $VDL_P$ which is supplied to the power-on reset circuit 105 upon startup rises with a delay. Accordingly, when the voltage (0.8 V) of the inversion level is detected in the power-on reset circuit 105, the voltages supplied to the other circuits 101 to 104 can be set to well exceed a voltage (e.g., 0.6 V) necessary for the initialization operation (reset operation).

Therefore, the initialization operation of all the circuits 101 to 104 can be reliably executed upon startup, and the normal operation performed after the initialization operation can also be secured.

(2) In this exemplary embodiment, to reliably execute the initialization operation of all the circuits 101 to 104, the power-on reset circuit is not provided for each of the circuits 101 to 104, but only one power-on reset circuit 105 is provided for the whole circuits 101 to 104.

Therefore, according to this exemplary embodiment, the initialization signal RST of high level can be supplied to all the circuits 101 to 104 at one time, whereby reset timings for all the circuits 101 to 104 match each other.

As a result, the operation after activation can be reliably secured without causing any operation failure due to variations in reset timing.

Moreover, only one power-on reset circuit 105 is required, which contributes to a reduction in size and manufacturing cost of the device, compared to the case of providing a plurality of power-on reset circuits.

(3) To reliably perform the initialization operation of all the circuits 101 to 104, it is also possible to adopt a configuration for giving a margin to the inversion level of the power-on reset circuit. In this exemplary embodiment, however, the inversion level of the power-on reset circuit can be suppressed to a level capable of securing the initialization operation of each circuit as in the related art.

As a result, even when the internal power supply voltage rapidly drops, the power-on reset circuit can be prevented from causing a malfunction due to an excessive response, and system operation can be stabilized.

(4) When the step-down circuit group 106 is classified into two groups including the startup non-operating step-down circuit group 107B, there is employed a configuration in which the initialization signal RST from the power-on reset circuit 105 is input to each of the step-down circuits $106V_5$ to $106V_8$ included in the startup non-operating step-down circuit group 107B, and the step-down circuits $106V_5$ to $106V_8$ are caused to stop operation upon receiving the initialization signal RST of low level.

This eliminates the need of providing an additional circuit for performing stop control of the step-down circuits $106V_5$ to $106V_8$, which prevents an increase in size and manufacturing cost.

During the stop control, the step-down circuits $106V_5$ to $106V_8$ use the power-on reset circuit 105, which is conventionally provided, in common with the other circuits 101 to 104. Accordingly, the circuit configuration remains simple, while the operation is complicated. Therefore, costs associated with the application of the present invention can be minimized.

Furthermore, the configuration of the step-down circuits $106V_5$ to $106V_8$ included in the startup non-operating step-down circuit group 107B can be achieved by adding the standby control section 106D to the configuration of conventional step-down circuits. Accordingly, the present invention can be achieved by a slight design change.

Second Exemplary Embodiment

Next, a second exemplary embodiment of the present invention will be described.

Figure 5:
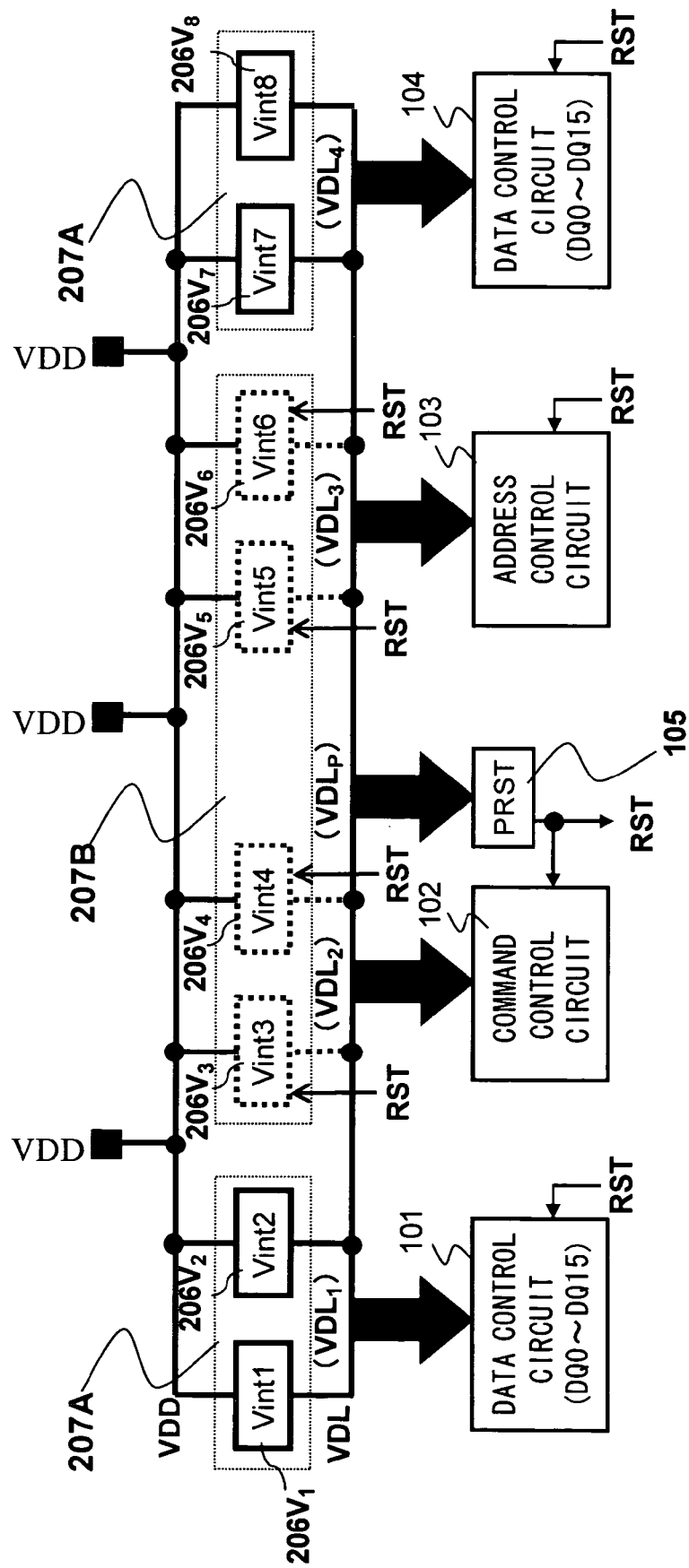
FIG. 5 is a diagram showing the configuration of a second exemplary embodiment of the present invention.

FIG. 5 is a diagram showing the configuration of the second exemplary embodiment.

The basic configuration of the second exemplary embodiment is similar to that of the first exemplary embodiment.

The second exemplary embodiment differs from the first exemplary embodiment in the layout of the peripheral circuits 101 to 104 and the power-on reset circuit 105, and in the layout of a startup non-operating step-down circuit group 207B.

Referring to FIG. 5, the power-on reset circuit 105 is disposed in a central area between the peripheral circuits 101 to 104, i.e., between the command control circuit 102 and the address control circuit 103 in FIG. 5.

Accordingly, startup operating step-down circuit groups 207A are disposed on the left and right sides of FIG. 5, and the startup non-operating step-down circuit group 207B is disposed at a central portion.

The step-down circuits are respectively represented by $206V_1$ to $206V_8$ from the left side of FIG. 5.

The two step-down circuits $206V_1$ and $206V_2$ provided on the left side of FIG. 5 and the two step-down circuits $206V_7$ and $206V_8$ provided on the right side of FIG. 5 are classified as the startup operating step-down circuit group 207A.

The four step-down circuits $206V_3$ to $206V_6$ provided at the central portion are classified as the startup non-operating step-down circuit group 207B.

In this configuration, the step-down circuits $206V_3$ to $206V_6$ provided on the side of the power-on reset circuit 105 are classified as the startup non-operating step-down circuit group 207B.

In this second exemplary embodiment, regarding the rise of the internal voltages after power-on, the internal power supply voltages ($VDL_1$ and $VDL_4$) supplied to the data control circuits 101 and 104, which are disposed at positions near the startup operating step-down circuit group ($206V_1$, $206V_2$, $206V_7$, and $206V_8$), rise first, and the internal power supply voltage $VDL_P$ supplied to the power-on reset circuit 105, which is disposed at a position near the startup non-operating step-down circuit group 207B, rises with a delay.

Accordingly, the voltage levels of the internal power supply voltages ($VDL_1$, $VDL_2$, $VDL_3$, $VDL_4$, and $VDL_P$) supplied to each circuit rise, while maintaining the following relation.

$$(VDL_1, VDL_4) > (VDL_2, VDL_3) > VDL_P$$

Therefore, the normal initialization operation can be secured as in the first exemplary embodiment shown in FIG. 1.

Third Exemplary Embodiment

Next, a third exemplary embodiment of the present invention will be described with reference to FIG. 6.

In the third exemplary embodiment, the power supply (VDL$_3$) of the address control circuit 103 is disposed in a power supply branch line W$_B$ which is branched from the basic power supply line W$_C$.

Figure 6:
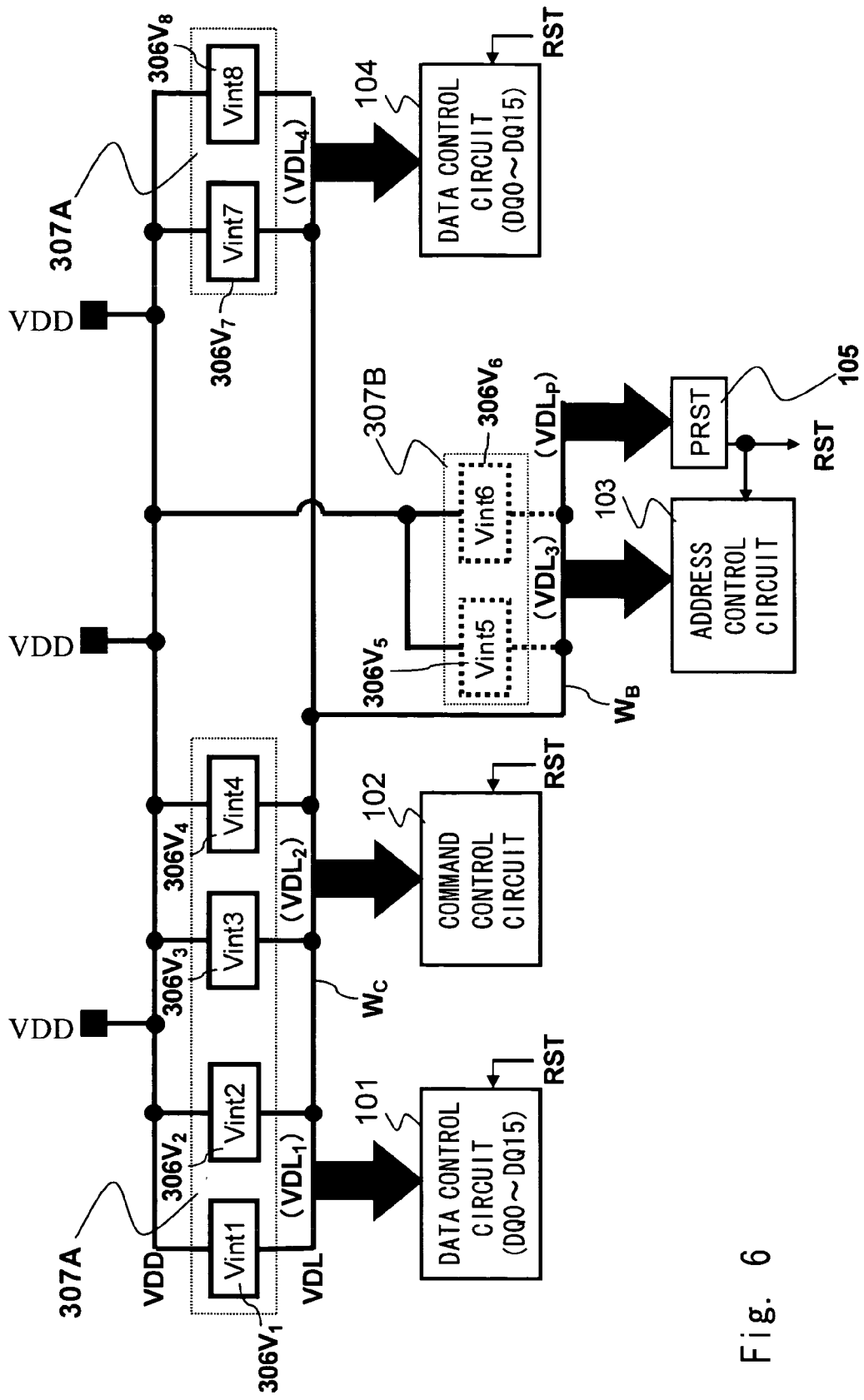
FIG. 6 is a diagram showing the configuration of a third exemplary embodiment of the present invention.

Referring to FIG. 6, step-down circuits 306V$_1$ to 306V$_8$ are classified into a startup operating step-down circuit group 307A (306V$_1$ to 306V$_4$, 306V$_7$, and 306V$_8$) and a startup non-operating step-down circuit group 307B (306V$_5$ and 306V$_6$).

The power-on reset circuit 105 is disposed at an end of the power supply branch line W$_B$ in which the startup non-operating step-down circuit group 307B is disposed.

In the third exemplary embodiment, one end of the power supply branch line W$_B$ is connected to the basic power supply line W$_C$, and thus the power-on reset circuit 105 is disposed at the other end of the power supply branch line W$_B$. The step-down circuits 306V$_5$ and 306V$_6$ that supply internal power to the power supply branch line W$_B$ are classified as the startup non-operating step-down circuit group 307B.

As a result, the power-on reset circuit 105 is disposed at a position where the wiring distance from the startup operating step-down circuit group 307A is longest among all the circuits 101 to 105.

In the third exemplary embodiment, regarding the rise of the internal voltages after power-on, the voltages (VDL$_1$, VDL$_2$, and VDL$_4$) of the basic power supply line W$_C$ in which the startup operating step-down circuit group 307A is disposed rise first, and the voltages (VDL$_3$ and VDL$_P$) of the power supply branch line W$_B$ in which the power-on reset circuit 105 is disposed rise with a delay.

Accordingly, the voltage levels of the internal power supply voltages rise, while maintaining the following relation.

$$(VDL_1, VDL_2, VDL_4) > VDL_3 > VDL_P$$

Therefore, the normal initialization operation can be secured as in the first exemplary embodiment shown in FIG. 1.

Fourth Exemplary Embodiment

Next, a fourth exemplary embodiment of the present invention will be described with reference to FIG. 7. In the fourth exemplary embodiment, the power supplies (VDL$_2$ and VDL$_3$) of the command control circuit 102 and the address control circuit 103 are disposed in the power supply branch line W$_B$ which is branched from the basic power supply line W$_C$.

Figure 7:
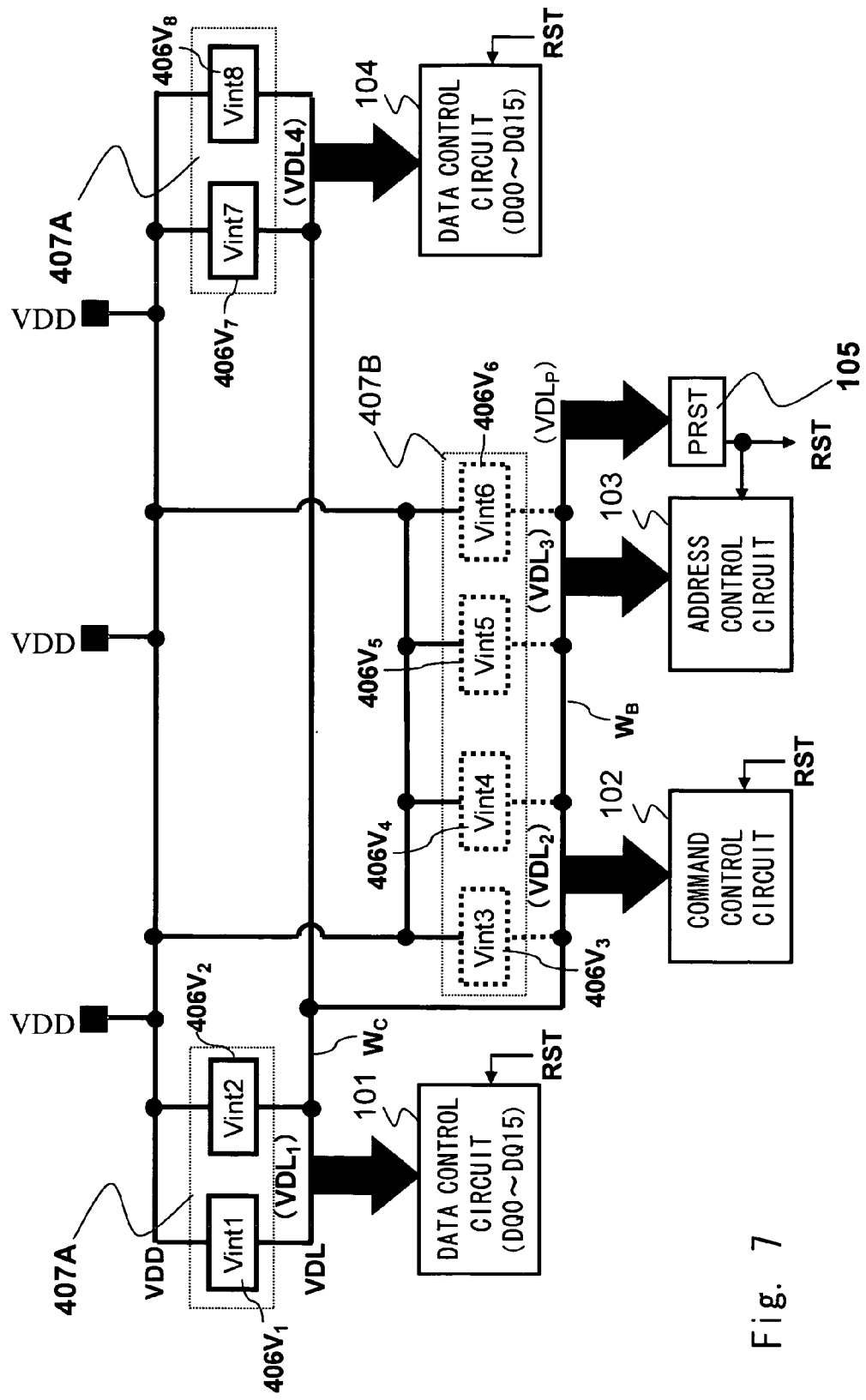
FIG. 7 is a diagram showing the configuration of a fourth exemplary embodiment of the present invention.

Referring to FIG. 7, step-down circuits 406V$_1$ to 406V$_8$ are classified into a startup operating step-down circuit group 407A (406V$_1$, 406V$_2$, 406V$_7$, and 406V$_8$) and a startup non-operating step-down circuit group 407B (406V$_3$ to 406V$_6$).

The power-on reset circuit 105 is disposed at an end of the power supply branch line W$_B$ in which the startup non-operating step-down circuit group 407B is disposed.

In the fourth exemplary embodiment, one end of the power supply branch line W$_B$ is connected to the basic power supply line W$_C$, and thus the power-on reset circuit 105 is disposed at the other end of the power supply branch line W$_B$. The step-down circuits 406V$_3$ to 406V$_6$ that supply internal power to the power supply branch line W$_B$ are classified as the startup non-operating step-down circuit group 407B.

As a result, the power-on reset circuit 105 is disposed at a position where the wiring distance from the startup operating step-down circuit group 407A is longest among all the circuits 101 to 105.

In the fourth exemplary embodiment, regarding the rise of the internal voltages after power-on, the voltages (VDL$_1$ and VDL$_4$) of the basic power supply line in which the startup operating step-down circuit group 407A is disposed rise first, and the voltages (VDL$_2$, VDL$_3$, and VDL$_P$) of the power supply branch line in which the power-on reset circuit 105 is disposed rise with a delay.

Accordingly, the voltage levels of the internal voltages rise, while maintaining the following relation.

$$(VDL_1, VDL_4) > VDL_2 > VDL_3 > VDL_P$$

Therefore, the normal initialization operation can be secured as in the first exemplary embodiment shown in FIG. 1.

Fifth Exemplary Embodiment

Next, a fifth exemplary embodiment of the present invention will be described with reference to FIG. 8.

In the fifth exemplary embodiment, the power supplies (VDL$_2$ and VDL$_3$) of the command control circuit 102 and the address control circuit 103 are disposed in the power supply branch line W$_B$ which is branched from the basic power supply line W$_C$.

Both ends of the power supply branch line W$_B$ are connected to the basic power supply line W$_C$.

Figure 8:
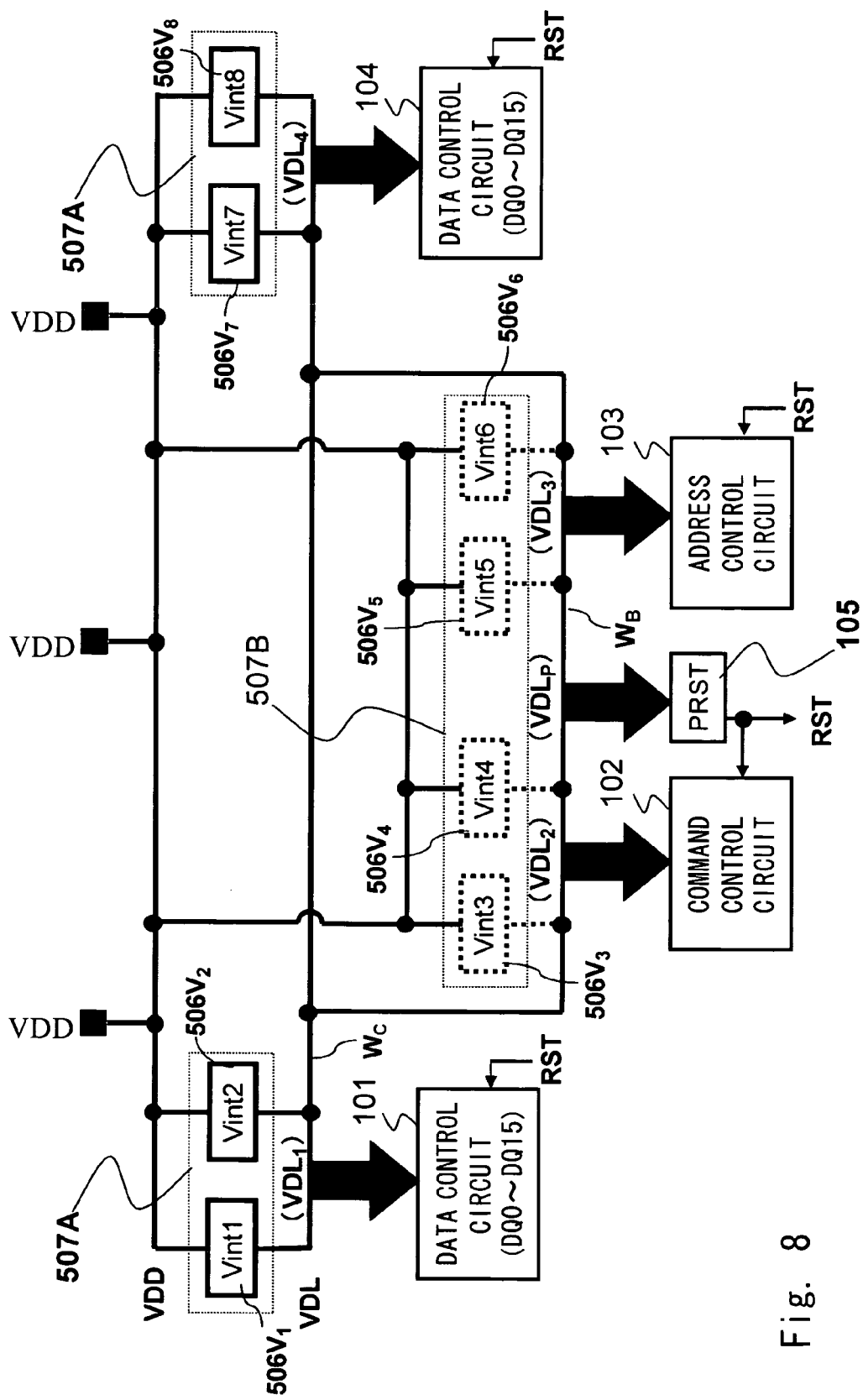
FIG. 8 is a diagram showing the configuration of a fifth exemplary embodiment of the present invention.

Referring to FIG. 8, step-down circuits 506V$_1$ to 506V$_8$ are classified into a startup operating step-down circuit group 507A (506V$_1$, 506V$_2$, 506V$_7$, and 506V$_8$) and a startup non-operating step-down circuit group 507B (506V$_3$ to 506V$_6$).

The power-on reset circuit 105 is disposed at a central portion of the power supply branch line W$_B$ in which the startup non-operating step-down circuit group 507B is disposed.

In the fifth exemplary embodiment, both ends of the power supply branch line W$_B$ are connected to the basic power supply line W$_C$.

Accordingly, the power-on reset circuit 105 is disposed at a central portion of the power supply branch line W$_B$, and the step-down circuits 506V$_3$ to 506V$_6$ that supply internal power to the power supply branch line W$_B$ are classified as the startup non-operating step-down circuit group 507B.

As a result, the power-on reset circuit 105 is disposed at a position where the wiring distance from the startup operating step-down circuit group 507A is longest among all the circuits 101 to 105.

In the fifth exemplary embodiment, regarding the rise of the internal voltages after power-on, the voltages (VDL$_1$ and VDL$_4$) of the basic power supply line W$_c$ in which the startup operating step-down circuit group 507A is disposed rise first, and the voltages (VDL$_2$, VDL$_3$, and VDL$_P$) of the power supply branch line W$_B$ in which the power-on reset circuit 105 is disposed rise with a delay.

Accordingly, the voltage levels of the internal power supply voltages rise, while maintaining the following relation.

$$(VDL_1, VDL_4) > (VDL_2, VDL_3) > VDL_P$$

Therefore, the normal initialization operation can be secured as in the first exemplary embodiment shown in FIG. 1.

Sixth Exemplary Embodiment

Next, a sixth exemplary embodiment of the present invention will be described with reference to FIGS. 9 and 10.

Figure 9:
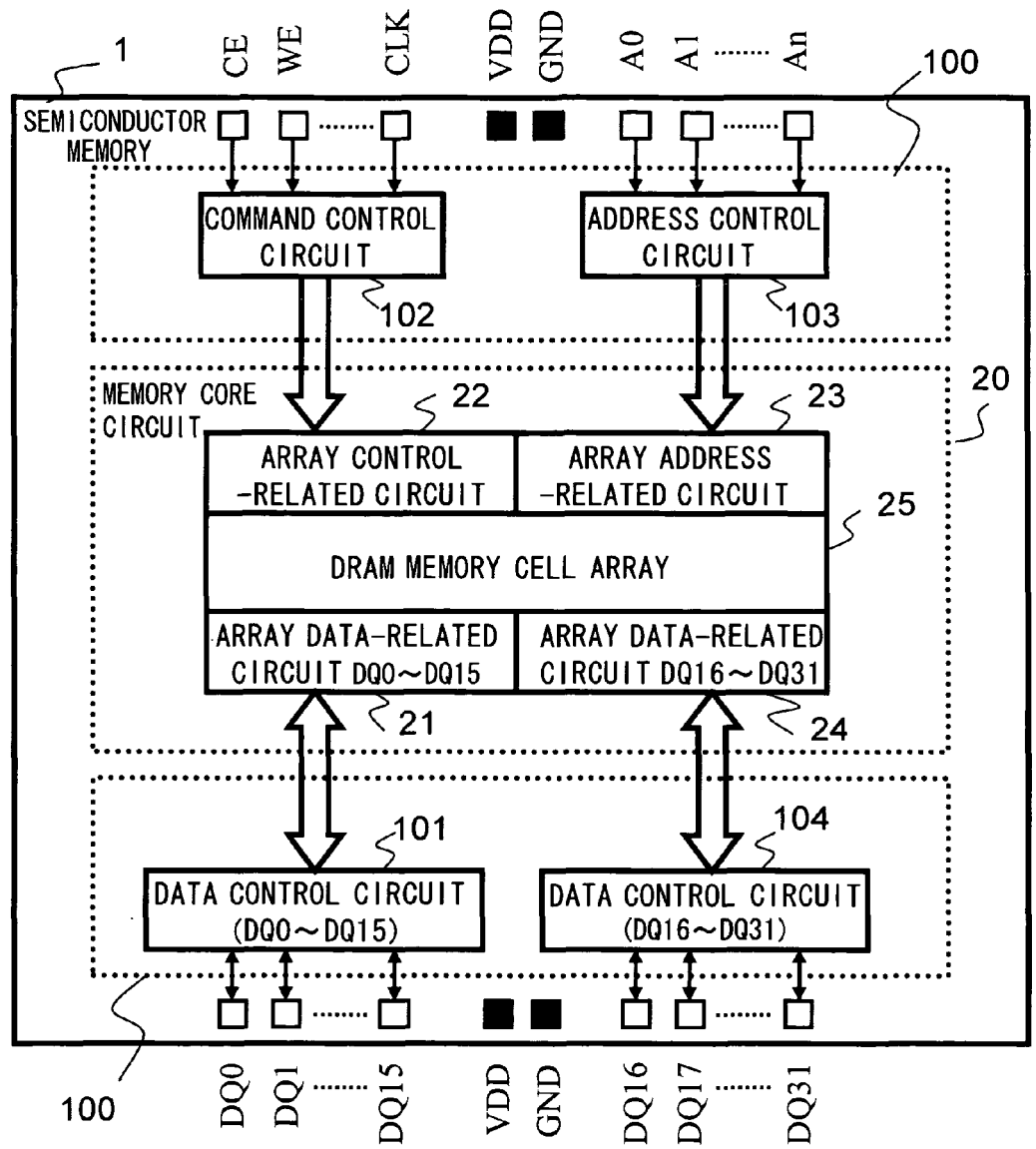
FIG. 9 is a block diagram showing the configuration of a semiconductor memory according to a sixth exemplary embodiment of the present invention.

FIG. 9 is a block diagram showing the configuration of a semiconductor memory according to the sixth exemplary embodiment.

Referring to FIG. 9, bonding pads are arranged along two sides of a semiconductor memory 1. The command control circuit 102 and the address control circuit 103 are disposed at the upper side, and the data control circuits 101 and 104 are disposed at the lower side.

Figure 10:
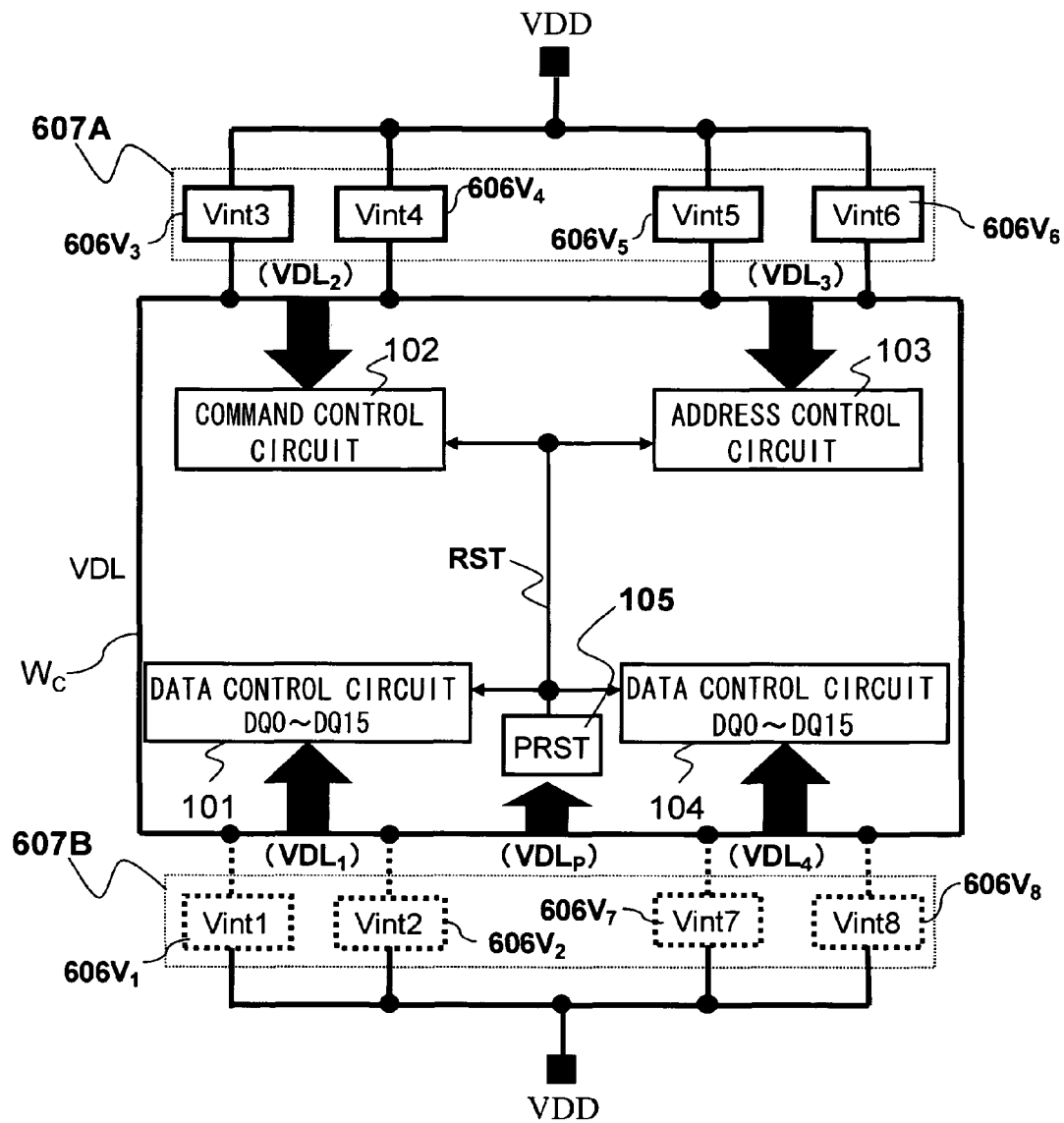
FIG. 10 is a diagram showing the layout of step-down circuits and a power supply line for supplying power to peripheral circuits according to the sixth exemplary embodiment.
Figure 11:
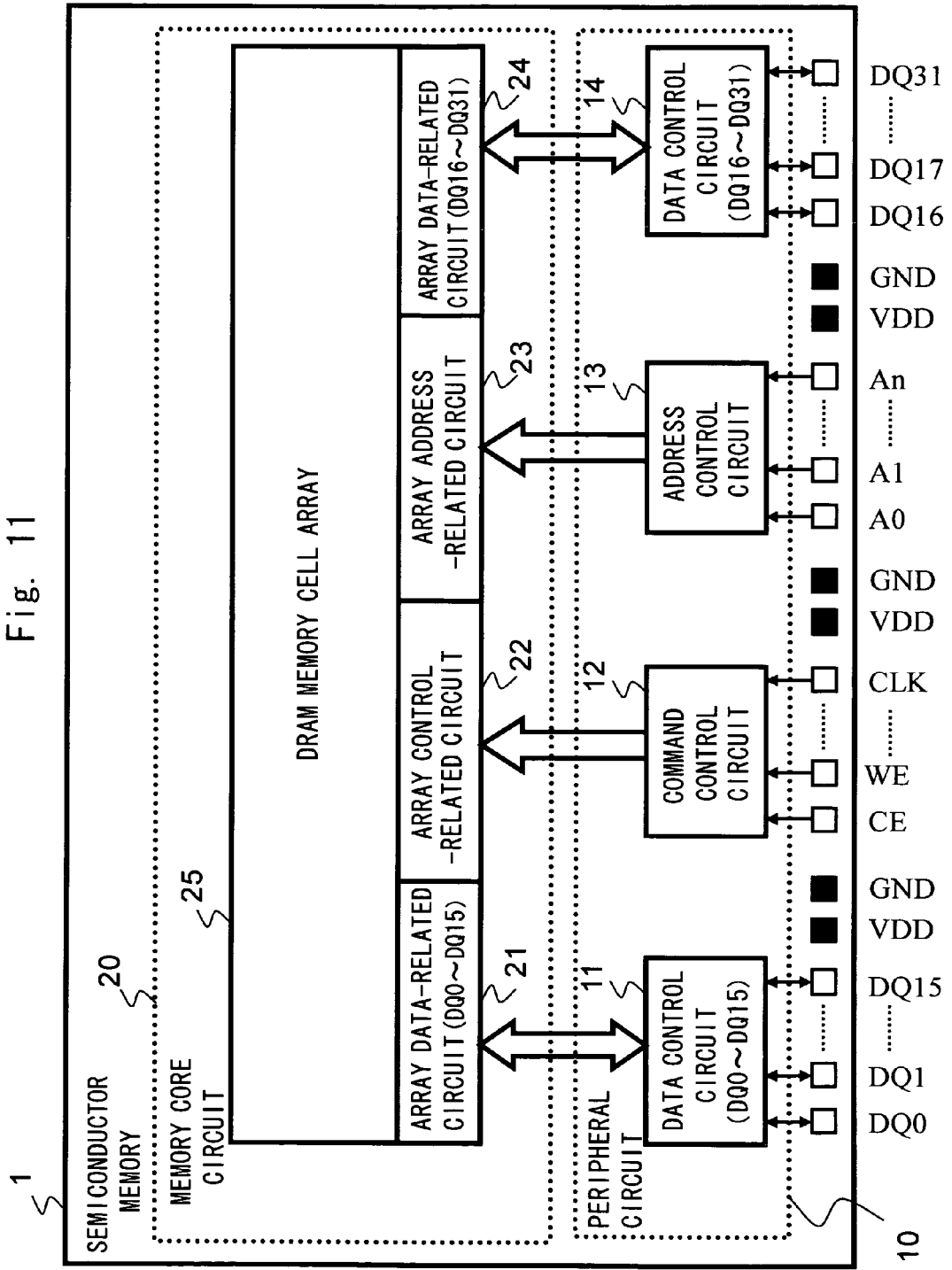
FIG. 11 is a block diagram showing the configuration of a semiconductor memory of the related art incorporating DRAM memory cells.

FIG. 10 is a diagram showing the layout of step-down circuits for supplying power to the peripheral circuits (101 to 104) shown in FIG. 9, and a power supply line.

Referring to FIG. 10, the basic power supply line $W_e$ for supplying internal power has a loop shape.

Step-down circuits $606V_1$ to $606V_8$ are classified into a startup operating step-down circuit group 607A ($606V_3$, $606V_4$, $606V_5$, and $606V_6$) and a startup non-operating step-down circuit group 607B ($606V_1$, $606V_2$; $606V_7$, and $606V_8$).

In this case, the startup operating step-down circuit group 607A ($606V_3$, $606V_4$, $606V_5$, and $606V_6$) are disposed at the upper side of the semiconductor memory 1, and the startup non-operating step-down circuit group 607B ($606V_1$, $606V_2$, $606V_7$, and $606V_8$) is disposed at the lower side of the semiconductor memory 1. The power-on reset circuit 105 is disposed between the data control circuit 101 and the data control circuit 104 at the lower side of the semiconductor memory 1 where the startup non-operating step-down circuit group 607B is disposed. In this layout, the power-on reset circuit 105 is disposed at a position where the wiring distance from the startup operating step-down circuit group 607A is longest among all the circuits 101 to 105.

In the sixth exemplary embodiment, regarding the rise of the internal voltages after power-on, the voltages ($VDL_2$ and $VDL_3$) at the upper side where the startup operating step-down circuit group 607A is disposed rise first, and the voltages ($VDL_1$, $VDL_4$, and $VDL_P$) at the lower side where the power-on reset circuit 105 is disposed rise with a delay.

Accordingly, the voltage levels of the internal power supply voltages rise, while maintaining the following relation.

$$(VDL_2, VDL_3) > (VDL_1, VDL_4) > VDL_P$$

Therefore, the normal initialization operation can be secured as in the first exemplary embodiment shown in FIG. 1.

The present invention is not limited to the above exemplary embodiments, and can be modified in various manners without departing from the scope of the present invention.

The inversion level of the power-on reset circuit and the voltage (0.6 V) necessary for the initialization of each circuit are illustrative only, and are not limited to the above numerical values.

While the case where only one power-on reset circuit is employed has been described in the above exemplary embodiments, a single power-on reset circuit may be provided for each module, or a plurality of power-on reset circuits may be provided for the entire system, if necessary.

While the semiconductor memory has been described as an example in the above exemplary embodiments, the present invention is not limited to the semiconductor memory, and can be widely applied to various semiconductor devices. Moreover, the present invention is not limited to the peripheral circuits (functional circuits) illustrated in the above exemplary embodiments.

In the above exemplary embodiment, the description has been made of the case where the known step-down circuit configuration is adopted as it is for the step-down circuits included in the startup operating step-down circuit group.

With this configuration, the related art can be applied, and the step-down circuits of the startup operating step-down circuit group are smaller than those of the startup non-operating step-down circuit group, which contributes to a reduction in size of the device.

Meanwhile, the step-down circuits included in the startup operating step-down circuit group may adopt the same configuration as the step down circuit shown in FIG. 2 of the startup non-operating step-down circuit group.

In this case, however, in place of the RST signal input to the step-down circuit shown in FIG. 2, the input signal rises upon power-on according to the power supply voltage VDD, and is fixed at the predetermined high level.

In this configuration, the step-down circuits of the startup non-operating step-down circuit group have the same configuration as the step-down circuits of the startup operating step-down circuit group, which facilitates the design and manufacturing processes.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution. The first to sixth exemplary embodiments can be combined as desirable by one of ordinary skill in the art.

What is claimed is:

1. A semiconductor device comprising:
    a step-down circuit group including a plurality of step-down circuits that step down an external power supply voltage to a predetermined voltage;
    a plurality of functional circuits that require a reset operation upon power-on; and
    a power-on reset circuit that outputs a reset command to the plurality of functional circuits, when an internal power supply voltage supplied from the step-down circuit group exceeds a voltage level necessary for an initialization operation, wherein
    the plurality of step-down circuits of the step-down circuit group are classified into a startup operating step-down circuit group that performs a step-down operation from power-on to supply the internal power supply voltage, and a startup non-operating step-down circuit group that stops operation upon power-on to interrupt supply of the internal power supply voltage, and
    the startup non-operating step-down circuit group includes the plurality of step-down circuits sequentially selected from one having a shortest wiring distance from the power-on reset circuit.

2. The semiconductor device according to claim 1, wherein the step-down circuits included in the startup non-operating step-down circuit group maintain an operation stopped state before receiving the reset command from the power-on reset circuit, and start the step-down operation upon receiving the reset command.

3. A semiconductor device comprising:
    a step-down circuit group including a plurality of step-down circuits that step down an external power supply voltage to a predetermined voltage;
    a plurality of functional circuits that require a reset operation upon power-on; and
    a power-on reset circuit that outputs a reset command to the plurality of functional circuits, when an internal power supply voltage supplied from the step-down circuit group exceeds a voltage level necessary for an initialization operation, wherein
    the plurality of step-down circuits of the step-down circuit group are classified into a startup operating step-down circuit group that performs a step-down operation from power-on to supply the internal power supply voltage, and a startup non-operating step-down circuit group that stops operation upon power-on to interrupt supply of the internal power supply voltage, and the power-on reset circuit has a longest wiring distance from the step-down circuits included in the startup operating step-down circuit group, compared to the plurality of functional circuits.

4. The semiconductor device according to claim 3, wherein the step-down circuits included in the startup non-operating step-down circuit group maintain an operation stopped state before receiving the reset command from the power-on reset circuit, and start the step-down operation upon receiving the reset command.

5. A semiconductor device comprising:
- a step-down circuit group including a plurality of step-down circuits that step down an external power supply voltage to a predetermined voltage;
- a plurality of functional circuits that require a reset operation upon power-on; and
- a power-on reset circuit that outputs a reset command to the plurality of functional circuits, when an internal power supply voltage supplied from the step-down circuit group exceeds a voltage level necessary for an initialization operation, wherein the plurality of step-down circuits of the step-down circuit group are classified into a startup operating step-down circuit group that performs a step-down operation from power-on to supply the internal power supply voltage, and a startup non-operating step-down circuit group that stops operation upon power-on to interrupt supply of the internal power supply voltage, the startup non-operating step-down circuit group includes the plurality of step-down circuits sequentially selected from one having a shortest wiring distance from the power-on reset circuit, and the power-on reset circuit has a longest wiring distance from the step-down circuits included in the startup operating step-down circuit group, compared to the plurality of functional circuits.

6. The semiconductor device according to claim 5, wherein the step-down circuits included in the startup non-operating step-down circuit group maintain an operation stopped state before receiving the reset command from the power-on reset circuit, and start the step-down operation upon receiving the reset command.

7. A method of supplying internal power to a semiconductor device, the semiconductor device comprising: a step-down circuit group including a plurality of step-down circuits that step down an external power supply voltage to a predetermined voltage; a plurality of functional circuits that require a reset operation upon power-on; and a power-on reset circuit that outputs a reset command to the plurality of functional circuits, when an internal power supply voltage supplied from the step-down circuit group exceeds a voltage level necessary for an initialization operation, the method comprising:
- causing the plurality of step-down circuits sequentially selected from one having a shortest wiring distance from the power-on reset circuit, to stop supplying the internal power supply voltage during a period from power-on to output of the reset command.

* * * * *